United States Patent [19]

Shirai et al.

[11] Patent Number: 5,029,051
[45] Date of Patent: Jul. 2, 1991

[54] HEADLAMP FOR MOTOR VEHICLES

[75] Inventors: Katsutada Shirai; Hideharu Mochizuki, both of Shizuoka, Japan

[73] Assignee: Koito Manufacturing Co., Ltd., Tokyo, Japan

[21] Appl. No.: 508,751

[22] Filed: Apr. 12, 1990

[30] Foreign Application Priority Data

| Apr. 17, 1989 | [JP] | Japan | 1-43979[U] |
| Jun. 19, 1989 | [JP] | Japan | 1-70853[U] |
| Dec. 27, 1989 | [JP] | Japan | 1-336265 |

[51] Int. Cl.$^5$ .................................. F21M 3/20
[52] U.S. Cl. ................................. 362/66; 362/269; 362/427; 33/365
[58] Field of Search ............ 362/61, 66, 285, 287, 362/427, 80, 269; 33/365, 370, 379

[56] References Cited

U.S. PATENT DOCUMENTS

| 1,609,634 | 12/1926 | Ryan | 33/370 |
| 2,058,743 | 10/1936 | Trippe | 362/311 |
| 3,612,854 | 10/1971 | Todd et al. | 362/269 |
| 4,660,128 | 4/1987 | Bergin et al. | 362/80 |
| 4,794,495 | 12/1988 | McMahan et al. | 362/66 |
| 4,802,067 | 1/1989 | Ryder et al. | 362/61 |
| 4,916,583 | 4/1990 | Nagasawa | 362/61 |

Primary Examiner—Ira S. Lazarus
Assistant Examiner—Richard R. Cole
Attorney, Agent, or Firm—Sughrue, Mion, Zinn, Macpeak & Seas

[57] ABSTRACT

A motor vehicle headlamp provided with a leveling gauge for determining whether or not the angle of irradiation of the light beam emitted by the headlamp is properly oriented in upward and downward directions which permits easy adjustment of the angle of irradiation of the headlamp beam. In the case of a movable reflector type headlamp, the headlamp is provided with a leveling gauge for measuring the amount of inclination of the irradiating angle of the headlamp in the upward and downward directions having a casing mounted on the upper wall area of the reflector in the front part of the headlamp unit in such a manner as to permit observation thereof through the exterior wall of the headlamp lens. One end part of the cover is supported elastically and held securely with an indented lance coupler formed in the juncture with the casing, while the other end part of the cover is held securely with a vertical screw threadedly engaged in the casing and is also supported elastically with a spring member installed between the cover and the casing.

16 Claims, 13 Drawing Sheets

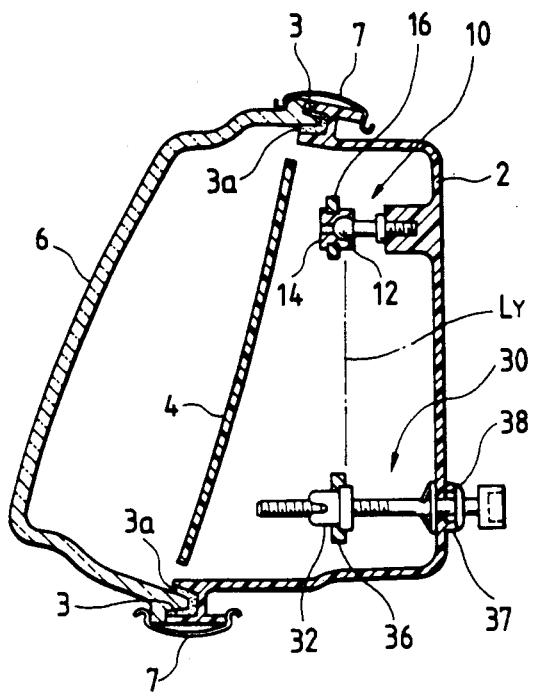

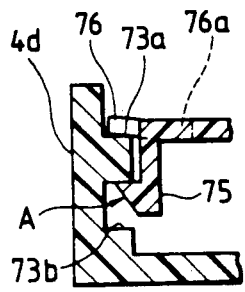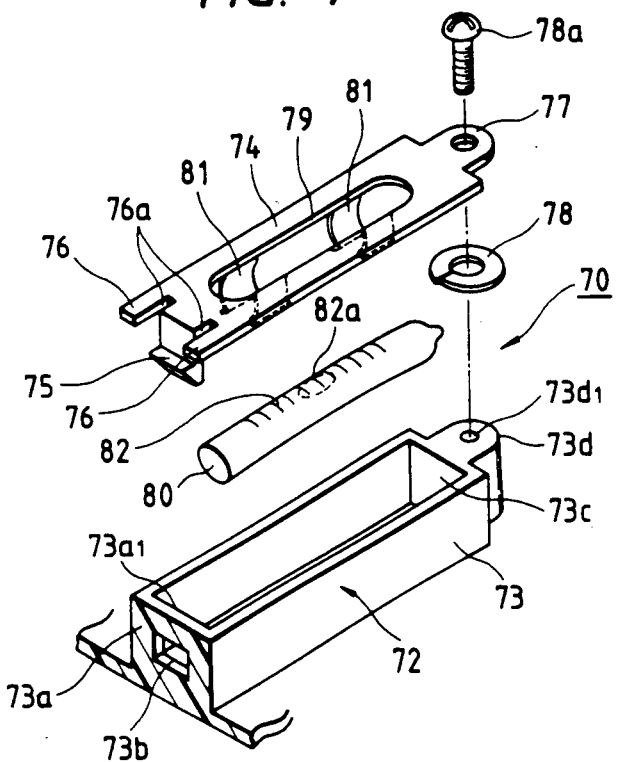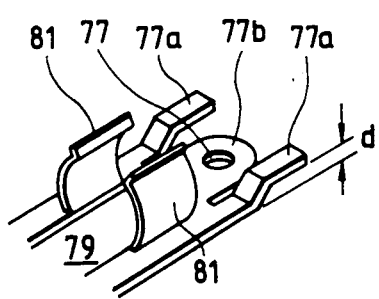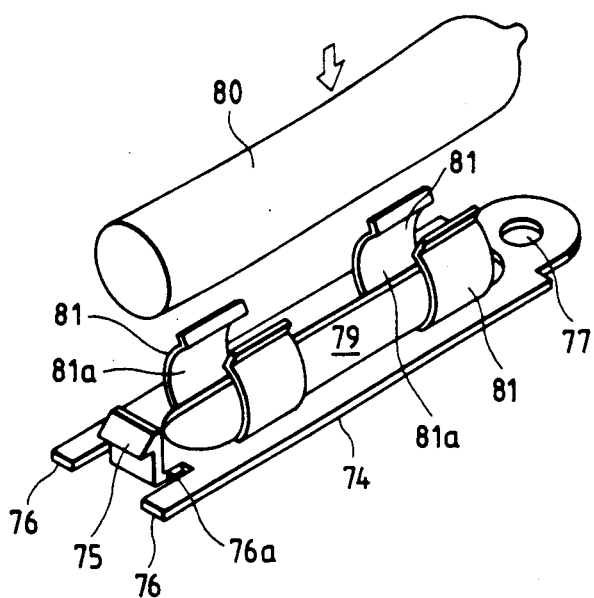

HEADLAMP FOR MOTOR VEHICLES

BACKGROUND OF THE INVENTION

The present invention relates to a motor vehicle headlamp which is provided with a leveling gauge for determining whether or not the angle of irradiation of the light beam emitted by the headlamp is properly oriented in upward and downward directions, and more particularly to such a motor vehicle headlamp which permits easy adjustment of the angle of irradiation of the headlamp beam.

A headlamp is generally provided with an aiming mechanism capable of adjusting the irradiating direction of the headlamp in both horizontal and vertical directions so as to adjust the angle of irradiation of the headlamp beam within a prescribed range. (This adjustment is hereinafter referred to as an "aiming adjustment"). To perform an aiming adjustment, the headlamp is turned on in a dark room with the beam of the headlamp being directed onto a screen at a prescribed distance from the headlamp, and the aiming mechanism is then adjusted so that the irradiated spot on the screen is set at a prescribed position.

However, the conventional aiming adjustment described above requires costly facilities and instruments such as a large dark room and a screen. Furthermore, the conventional aiming adjustment presents a problem in that it takes a significant amount time to complete the adjusting work since is necessary to perform the aiming adjustment through observation of the screen.

Headlamps approved for use in the United States generally have three location bosses provided in the form of protrusions on the lens in the front part of the unit. A measuring instrument called an "aimer" is set in direct contact with the location bosses to determine whether or not the beam of the headlamp is properly adjusted in relation to the horizontal plane. For this purpose, the front end surfaces of the location bosses are shaped and disposed so as to define a vertical plane when the motor vehicle is in a level state. The amount of inclination of the headlamp in relation to the horizontal plane can be measured with the aimer set in such a way as to use the front end areas of these location bosses with which it is in direct contact as a datum plane.

It is required that the measured value (the measured amount of inclination) as determined with the aimer be within a prescribed range. Accordingly, it is absolutely necessary to provide these location bosses on headlamps for use in the United States. This requirement has proved troublesome in that headlamps for use in the United States must be manufactured separately from those for use in Japan or Europe.

SUMMARY OF THE INVENTION

The present invention has been made in consideration of the above-mentioned problems, and accordingly an object of the invention is to provide a motor vehicle headlamp having a simple construction and which enables the easy checking of whether or not there is any error in the irradiating angle of the headlamp beam in the upward and downward directions and to allow for the proper adjustment of the angle of irradiation of the headlamp in the upward and downward directions without the necessity of such elaborate large-scale facilities and instruments as a dark room, screen, and aimer.

Headlamps for motor vehicles are generally of two types, one being the movable reflector type in which a reflector separate from the lamp body is mounted inside the lamp body in such a manner as to permit the adjustment of the reflector in relation to the lamp body, and the other being the movable unit type in which the reflector is formed in an integrated construction with the lamp body, the unit being installed in such a way as to permit a tilting movement in relation to the lamp housing. The means and measures to be taken in each of these cases will be explained in detail below.

First, in the case of the movable reflector type headlamp, the headlamp according to the invention is a motor vehicle headlamp which has a leveling gauge for measuring the amount of inclination of the irradiating angle of the headlamp in the upward and downward directions provided in a specified position in the area of the upper wall of the lens in the front part of the headlamp unit in such a manner as to permit observation thereof through the upper exterior wall of the lens in the front part of the headlamp, wherein the leveling gauge is comprised of a casing with an upper opening and which is formed integrally with the reflector, a cover with a window therein, and a bubble vial held in a clasping part provided on the back side of the cover with the graduated side of the vial being visible through the window. One end part of the cover in the forward and backward directions is supported elastically and held securely with an indented lance coupler formed in the juncture with the casing so as to prevent the cover from falling off while the other end part of the cover in the forward and backward directions is held securely with a vertical screw threadedly engaged in the casing and is also supported elastically with a spring member installed between the cover and the casing.

On the other hand, in case where the headlamp is of the movable unit type, the headlamp according to the invention is a motor vehicle headlamp which has a leveling gauge for measuring the amount of inclination of the irradiating angle of the headlamp in the upward and downward directions and which is installed in a specified position on the upper wall of the lamp body, wherein the leveling gauge is comprised of a casing formed with an upper opening and which is integral with the reflector, a cover provided with a window and installed in the upper opening part of the casing, and a bubble vial held in the clasping part provided on the back of the cover with the side of the vial having graduations visible through the window. An end part of the cover in the forward and backward directions is supported elastically so as to be held securely with an indented lance coupler formed in the juncture with the casing, while the other end part of the cover in the forward and backward directions is held securely with a vertical screw threadedly engaged in the casing, and is also supported elastically with a spring member installed between the cover and the casing.

The inclination angle of the reflector (or the lamp body in the case of a headlamp of the movable unit type) in the upward and downward directions is indicated on the leveling gauge, making it possible to easily read the amount of inclination of the reflector (or the lamp body in the case of a headlamp of the movable unit type) in the upward and downward directions, which corresponds to the amount of inclination of the irradiating angle of the headlamp beam in the upward and downward directions. Additionally, because the leveling gauge is mounted on the upper wall of the reflector (or the lamp body in the case of a headlamp of the movable unit type), it is easy for the operator to read the leveling gauge, and, particularly in the case of the movable lamp body type, the graduations on the leveling gauge can be read through the upper exterior wall of the lens in the front part of the headlamp.

In order to make adjustments of the irradiating angle of the headlamp beam in the upward and downward directions, an aiming adjustment is effected by moving the reflector (or the lamp body in the case of the movable unit type) in such a manner as to cause the bubble in the leveling gauge to align with a prescribed position.

The assembly of the leveling gauge in the headlamp unit is carried out by setting the cover holding the bubble vial securely in the clasping part in the upper opening part of the casing, connecting an end part thereof held in a lance coupling to the casing of the bubble vial, and fixing the other end part with a screw. Thus, the mounting of the leveling gauge on the headlamp unit is completed at the same time as the assembly of the leveling gauge.

BRIEF DESCRIPTION OF THE DRAWINGS

The manner by which the above objects and other objects, features and advantages of the present invention are attained will be fully evident from the following detailed description when considered in light of the drawings, wherein:

FIG. 4 is a sectional view of the same headlamp along the line IV—IV shown in FIG. 1;

FIG. 5 illustrates a vertical section of the inclination measuring instrument shown in FIG. 1;

FIG. 6 illustrates a vertical section of a leveling gauge, which constitutes a second inclination measuring instrument;

FIG. 6(a) is an enlarged sectional view showing an indented lance coupler disposed between the cover and the bubble vial casing of the leveling gauge constituting the second inclination measuring instrument;

FIG. 7 is a perspective view of the disassembled leveling gauge constituting the second inclination measuring instrument;

FIG. 8 is a perspective view illustrating the cover of the leveling gauge as viewed from the side of the bottom thereof;

FIG. 9 is a perspective view of the principal parts of a second embodiment of the invention;

DESCRIPTION OF THE PREFERRED EMBODIMENTS

Figure 1:
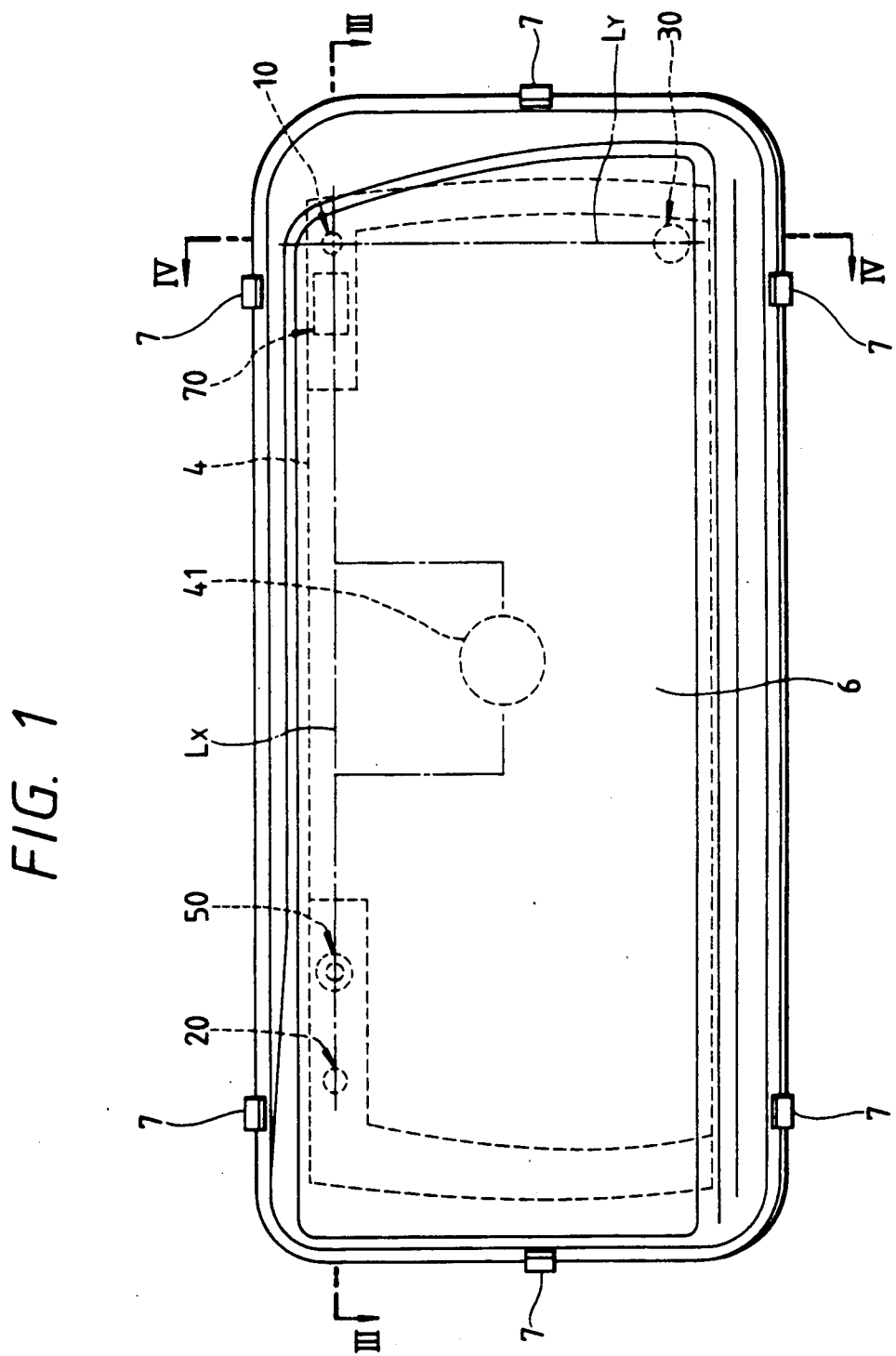
FIG. 1 is a front view of a headlamp of the movable body type constructed according to a first embodiment of the present invention.

Preferred embodiments of the present invention will now be described width reference to the accompanying drawings, in which like reference characters designate like or corresponding parts throughout the several drawings.

In the description to follow, some embodiment of the present invention will be used as examples. It should be understood, however, that the present invention is not limited to these examples, but may be applied effectively to other embodiment without deviating from the technical scope of the present invention.

Figure 2:
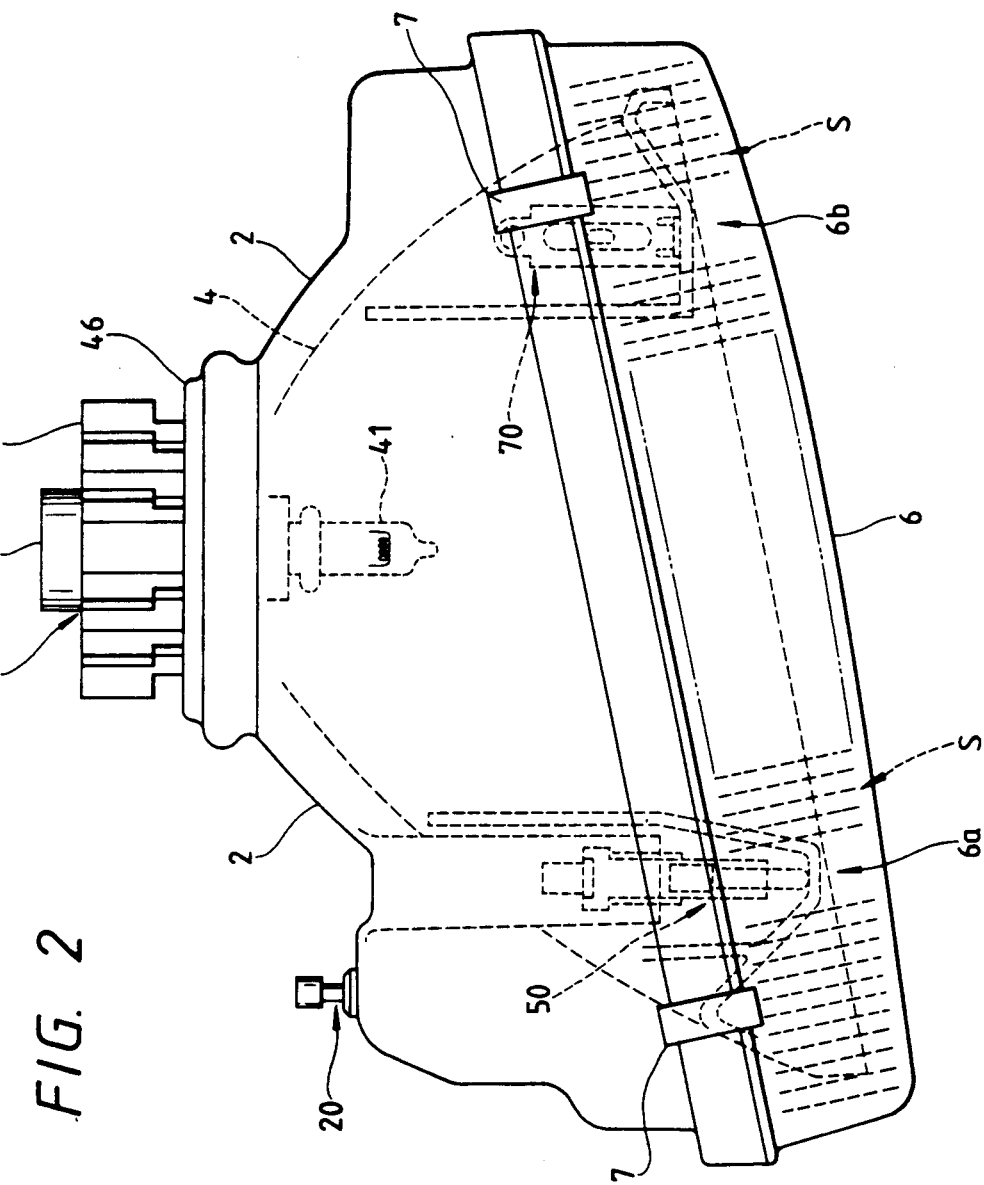
FIG. 2 is a plane view of the headlamp shown in FIG. 1.
Figure 3:
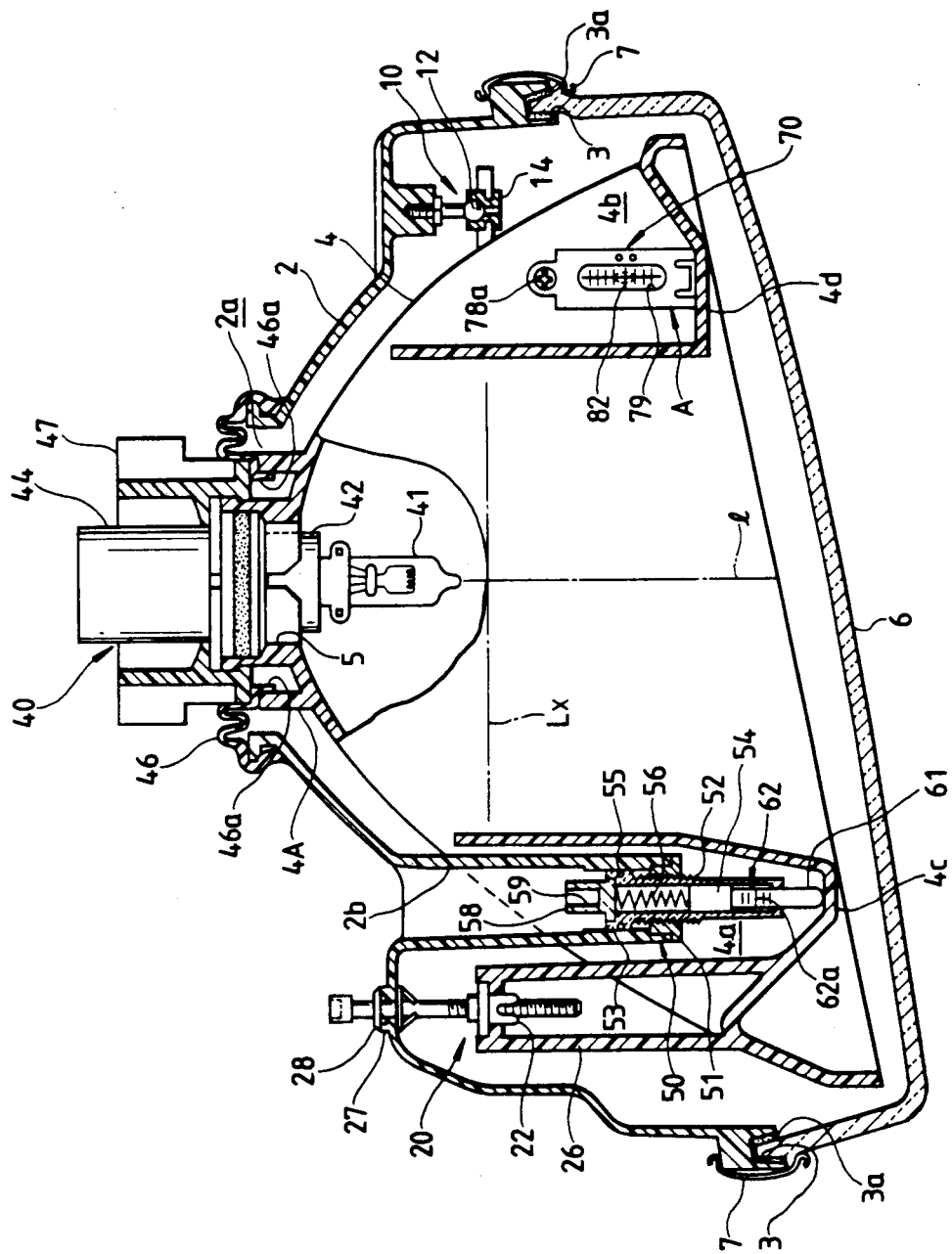
FIG. 3 is a sectional view of the same headlamp along the line III—III indicated in FIG. 1.

A first embodiment of the present invention in the form of a motor vehicle headlamp of the movable reflector type will be described in detail with reference to FIGS. 1 through 9 of the attached drawings. FIG. 1 is a front view of the headlamp provided with an irradiating angle adjusting device, and FIG. 2 is a plane view of the same. FIG. 3 is a horizontal sectional view illustrating some parts with the rest cut away, while FIG. 4 is a vertical sectional view of these parts. FIG. 5 is a vertical sectional view of a inclination measuring instrument which measures the inclination of the irradiating direction of the headlamp beam in leftward and rightward directions, and FIG. 6 is a vertical sectional view of the mounting part of the leveling gauge, which constitutes the second inclination measuring instrument. FIG. 6(a) is an enlarged sectional view showing a coupler between the leveling gauge cover, which holds the bubble vial, and the bubble vial casing of the leveling gauge. FIG. 7 is a perspective view of the leveling gauge in a disassembled state. FIG. 8 is a perspective view illustrating the cover of the leveling gauge as viewed from the bottom. FIG. 9 is a perspective view of principal parts of an example of a modified embodiment of the invention.

In these drawings, reference numeral 2 indicates a lamp body in the form of a casing. A reflector 4 is mounted inside the lamp body, and a lens 6 is set in the rectangular front opening of the lamp body 2, these components thereby defining an integrated headlamp unit.

The reflector 4 is supported at three points with the ball joint 10 and the adjusting screws 20 and 30, as illustrated in FIGS. 1, 3 and 4. The spherical part 12 of the ball joint 10 is supported on the side of the lamp body 2, and the reflector 4 is set in such a manner that it can swing on the ball joint 10 as the center of its motion. Also, the adjusting screws 20 and 30 are both supported on the lamp body 2 in such a manner as to permit their free rotating motion. The adjusting screws 20 and 30 are threadedly engaged with nuts 22 and 32 provided on the side of the reflector 4. Hence, the nuts 22 and 32 are moved forward and backward along the adjusting screws 20 and 30 by turning the adjusting screws 20 and 30, and the inclination of the reflector 4 is changed by this operation.

Reference numeral 14 indicates a socket for bearing the spherical part 12, which socket is rigidly supported by a bracket 16 fixed on the back side of the reflector 4. Also, reference numerals 22 and 32 designate nuts with which the adjusting screws 20 and 30 are threadedly engaged, which nuts are supported by brackets 26 and 36 fixed on the back side of the reflector 4. Reference numerals 27 and 37 indicate O-rings, and reference numerals 28 and 38 denote flange parts formed with protrusions on the adjusting screws 20 and 30.

The supporting point for the reflector 4 with the adjusting screw 20 (i.e., the helical joint part of the adjusting screw 20 and the nut 22) is positioned on the horizontal axis Lx crossing the optical axis l of the bulb 41 (described below) at right angles and passing through the ball joint 10, and the supporting point for the reflector 4 with the adjusting screw 30 (i.e., the helical joint part of the adjusting screw 30 and the nut 32) is positioned on the vertical axis Ly crossing the optical axis l at right angles and passing through the ball joint 10. Hence, the reflector 4 swings along the vertical axis Ly when the adjusting screw 20 is turned. Accordingly, it is possible to adjust the inclination of the reflector 4 in leftward and rightward directions to thus adjust the irradiating angle of the headlamp beam in the leftward and rightward directions. Further, the reflector 4 swings along the horizontal axis Lx, which crosses the vertical axis Ly at right angles, when the adjusting screw 30 is turned. Accordingly, it is possible to adjustment the inclination of the reflector 4 in the upward and downward directions, and thus adjust the irradiating angle of the headlamp beam in the upward and downward directions. Thus, the headlamp according to this invention provides effective means of adjusting the inclination of the reflector 4, i.e., adjusting the irradiating angle of the headlamp beam, by the turning of the two adjusting screws 20 and 30.

Reference numeral 40 in FIG. 3 indicates a bulb socket formed integrally with the bulb 41 connected thereto. On the back side of the lamp body 2, an opening 2a is formed for the attachment and detachment of the bulb socket, and the bulb socket 40 is set into the socket hole 5 formed in the rear top part of the reflector 4, being passed through the opening 2a in the rear part of the lamp body. A cover 46 made of rubber for closing the opening between the reflector 4 and the lamp body 2 is set on the outer circumference of the rear top part of the reflector 4. The bulb socket 40 is rigidly fitted under pressure into the socket hole 5 of the lamp body with the locking cap 47 provided on the outer circumference of the bulb socket 40. At the same time, the rim of the inner circumference of the rubber cover 46 is set in close contact under pressure onto the circumferential wall on the back side of the lamp body. Reference numeral 42 indicates a metal mouthpiece in which the bulb is to be set, and reference numeral 44 a cylindrical connector part having a connecting terminal provided in its interior.

Also, in FIGS. 1 through 4, reference numeral 3 indicates a sealing groove formed in the rim of the front opening part of the lamp body 2 to which setting clamps of the front lens 6 are joined. A sealing agent 3a is filled in the sealing groove 3. Additionally, reference numeral 7 represents a clip which mechanically connects the front lens 6 with the lamp body 2.

In FIGS. 1 through 3 and in FIG. 5, reference numeral 50 indicates the first inclination measuring instrument, which is mounted in a position in a horizontal plane including the horizontal axis Lx and which is employed to measure the inclination of the reflector 4 in the leftward and rightward directions, i.e., the inclination of the irradiating angle of the headlamp beam in the leftward and rightward directions. On the inner side of the lamp body 2, a cylindrical protruding part 2b constructed integrally with the lamp body protrudes toward the reflector 4, extending into the concave part 4a formed in the corner area on the left side of the upper wall of the reflector 4. The inclination measuring instrument 50 is installed on this protruding part 2b of the lamp body and arranged parallel to the optical axis l. This inclination measuring instrument 50 is composed of a cylindrical supporting member 52, a rod member 54 inserted into this supporting member 52, and a compression coil spring 56 positioned inside the supporting member 52 and which applies a force to the rod member 54 in the forward direction.

A screw 51 is fixed rigidly on the forward end of the protruding part of the lamp body, and a transparent supporting member 52 made of synthetic resin is threadedly joined to the screw 51. On the end part of the supporting member 52 is formed an expanded diameter part 53. An O-ring 55, which seals the surface in sliding motion with the protruding part 2b of the lamp body, is set on the outer circumference -of the expanded diameter part 53. A cap 58 formed with a driver setting part 59 is integrally fused with the supporting member 52 on the expanded diameter part 53. By rotating the supporting member 52 with a screwdriver (not shown) relative to the screw 51, the position of the supporting member 52 can be adjusted forward and backward in the axial direction in relation to the lamp body 2.

The rod member 54 inserted into the supporting member 52 has the form of a rod with a stepped structure. The small diameter part 61 of the rod remains in direct contact with the back area of the upright wall 4c of the reflector 4, being pushed forward under the force applied thereto by the compression coil spring 56. A circumferential datum line (FIG. 5) is formed on the outer circumference of the forward end part of the transparent supporting member 52, and straight-line graduations 62 are marked in the axial direction on the small diameter part 61 of the rod. Thus, when the reflector 4 swings along the vertical axis Ly of the reflector 4, the rod member 54 slides accordingly forward and backward in the axial direction, the graduated scale indicating changes therewith in the position of the datum line 52a.

The part $4c_1$ of the upright wall 4c in direct contact with the small diameter part of the rod is formed with a curved surface with a radius R centered around the horizontal axis Lx, as illustrated in FIG. 5. Accordingly, the reading on the graduated scale of the first inclination measuring instrument 50 is not changed by the tilting movement of the lamp body in the upward and downward directions. The inclination measuring instrument 50 is set in such a way that the zero point 62a of the graduated scale 62 aligns with the position of the datum line 52a when the inclination of the reflector 4 in the leftward and rightward directions is proper. Thus, the scale is calibrated so that the point indicating the position of the datum line 52a on the graduated scale represents the amount of inclination of the reflector 4 in the leftward and rightward directions.

The position of the datum line 52a which corresponds to the point for reading the graduated scale is set at a position bordering on the side wall in the upper part of the front lens 6. The area 6a, which corresponds to the point for reading the graduated scale for the front lens 6, does not have any stepped structure formed thereon. That is, diffusing steps S, which extend approximately parallel to the optical axis, are formed at regular intervals, as illustrated in FIG. 2, so that leakage light from the side area of the front lens 6 is thereby rendered inconspicuous, while the side wall area 6a of the front lens 6 in correspondence to the first inclination measuring instrument 50 has no such steps formed therein so that the amount of inclination can be read through the stepfree area.

In FIGS. 1 through 3 and FIGS. 6 through 8, reference numeral 70 indicates a leveling gauge, which is the second inclination measuring instrument for measuring the inclination of the reflector 4 in the upward and downward directions, i.e., the inclination of the irradiating direction of the headlamp beam in the upward and downward directions. The leveling gauge 70 includes a straight-line type bubble vial 80 inside a leveling gauge casing 72 formed in the wall of the upper part of the reflector.

The leveling gauge casing 72 is formed integrally with the reflector 4, with the rectangular side wall 73 rising upright from the wall in the upper area of the reflector. In an opening in the upper area of the casing 72, a cover 74 made of highly elastic synthetic resin, such as U-polymer and polyacetal, with the bubble vial installed on its back, is rigidly mounted with the use an indented lance coupling and tightening screws. That is, the side wall area 73a of the casing 72 on the front side of the lamp is integrally constructed with the upright wall 4d of the reflector 4. A concave part 73b in a rectangular shape is formed in the side wall area 73a on the front side, and a hook 75, which protrudes perpendicularly downward and is joined to the concave part 73b on the side of the casing mentioned above, is provided in the forward end part of the cover 74. Also in the forward end part of the cover, a pair of suspending parts 76 are formed extending on both sides of the hook 75 across the slit 76a. When the hook 75 is suspended in the concave part 73b in the state wherein the suspending part 76 is in direct contact with the upper end surface $73a_1$ in the side wall area on the front side, the suspending part 76 and the hook 75 are elastically deformed in mutually reverse directions in the manner of a cantilevered beam, whereby the forward end part of the cover is held in such a way as to prevent its falling off in the upward and downward directions and also held elastically in the upward and downward directions, as illustrated in FIG. 6(a). Accordingly, there is formed between the forward end part of the cover and the side wall 73a on the front side of the casing an indented elastic lance coupler A composed of a concave part 73b for securing and also elastically supporting the forward end part of the cover, hook 75 and suspending part 76.

A screw inserting hole 77 is formed in the rear end part of the cover 74, and a boss 73d with a screw hole $73d_1$ therein is formed in the side wall area 73c of the leveling gauge casing on the back side of the lamp. With a spring washer 78, such as a corrugated washer, placed between the rear end part of the cover and the upper end surface of the boss 73d, the rear end part of the cover is fixed with a screw to thereby be mounted elastically in the upward and downward directions. Reference numeral 78a indicates a vertical tightening screw. The amount of inclination of the cover 74 can be adjusted by rotating the tightening screw 78a.

On the back side of the cover 74, a straight-line type bubble vial 80 is mounted with a clasping piece 81. The surface of the bubble vial 80 where the graduations 82 are marked is visible through a window 79 formed in an oblong shape in the central area of the cover. The clasping piece 81, which is a spring member for clasping the bubble vial 80 to hold it in place, is provided as a unitary structure with the cover 74, as illustrated in FIG. 8. The clasping piece 81 is provided with a clasping area 81a, which is in approximate alignment with the curved surface on the outer circumference of the bubble vial 80. As indicated by an arrow in FIG. 8, the bubble vial 80 can be set in place and fixed in the cover 74 with a single simple motion by inserting the bubble vial 80 into the cover 74 from the forward end side of the clasping piece 81.

In this regard, reference numeral 2c in FIG. 6 indicates an opening formed in the lamp body area in correspondence to the tightening screw 78a for the tightening of the rear end part of the cover 74. The bubble vial 80 is so designed that the position of the bubble in the bubble vial 80 can be adjusted by turning the tightening screw 78a with a screwdriver inserted through the opening 2c. Reference numeral 2d designates a freely attachable and detachable rubber cap set in the opening 2c.

The installation of the leveling gauge 70 on the reflector 4 is carried out by installing the bubble vial 80 in the cover 74 and setting the resulting assembly in the casing 72. The cover 74 is integrated with the leveling gauge 70 on the wall in the upper part of the reflector 4 by first joining the forward end part of the cover 74 by a lance coupling with the side wall 73a in the front side of the casing, and then securing the rear end part of the cover with a screw.

In the conventional leveling gauge of the same general type, a bubble vial is set solidly with gypsum in the container to form a unified structure therewith. In contrast, the headlamp of this embodiment of the invention is designed so that the mounting of the leveling gauge 70 on the reflector 4 can be accomplished at the same time as the assembly of the leveling gauge 70. In addition, the mounting of the leveling gauge 70 on the reflector 4 can be done only with a single tightening screw 78a due to the use of a lance coupling on one side between the leveling gauge 70 and the reflector 4.

The leveling gauge 70 is adjusted by turning the tightening screw 78a in such a manner that the bubble in the leveling gauge 70 is positioned at the zero point 82a on the straight-line graduated scale 82 when the inclination of the reflector 4 in the upward and downward directions, i.e., the irradiating angle of the headlamp beam is proper in the upward and downward directions. Moreover, the area 6b, which corresponds in position to the leveling gauge 70 for the front lens 6, is formed as a step-free surface so that the amount of inclination can be read therethrough from the upper part of the side periphery of the front lens 6.

FIG. 9 shows the principal parts of a second embodiment of the second inclination measuring instrument. In the preceding embodiment, a spring washer 78 is set on the screwfixed side of the cover 74 for the leveling gauge 70. However, in this embodiment a construction is employed in which a step d (FIG. 9) is formed between the surface joined to the casing 73 and a screw seat at the end part of the cover, and the rear end part of the cover is held elastically using this step. More specifically, a pair of bent extensions 77a are formed protruding on both sides of the peripheral area of the screw inserting hole 77 in the end part of the cover. When the tightening screw 78a is screwed into the screw inserting hole $73d_1$ in the boss 73d, a compressive force acts between the curved extension 77a and the screw seat surface 77b, holding the end part of the cover elastically.

The adjustment procedure of the inclination measuring instrument when the headlamp unit is mounted on a vehicle body and the procedure to be employed after the headlamp unit has been mounted on the vehicle body for adjusting the irradiating angle of the headlamp beam will now be explained.

The headlamp, as a single unit, is set in such a way that the light distribution characteristics of the headlamp unit in the leftward and rightward directions will be in the proper position when the position of the zero point 62a on the graduated scale on the rod member 54 in the first inclination measuring instrument 50 is aligned with the position of the datum line 52a, and that the light distribution characteristics of the headlamp unit in the upward and downward directions are proper when the bubble in the leveling gauge 70, which is the second inclination measuring instrument, is aligned with the zero point 82a on the straight-line graduated scale 82 of the gauge.

Subsequently, after the headlamp unit with the first and second inclination measuring instruments 50 and 70 has been installed on the vehicle body, if the indications on the graduated scales of the respective inclination measuring instruments are not at the proper positions as a consequence of various errors, it becomes necessary to adjust the graduated scales of the first and second inclination measuring instruments so as to set them in their proper condition.

To adjust this graduated scales, the vehicle body and an optical aimer are set face to face for the adjustment of the first inclination measuring instrument 50, and the optical axis l of the headlamp unit is made to agree with the vehicle axis by turning the adjusting screws 20 and 30. At this time, the position of the datum line 52a and the position of the zero point 62a on the graduated scale may not agree with each other as a consequence of factors such as a deviation in the lamp mounting surface on the vehicle body. The supporting member 52 is turned with a screwdriver, moving the supporting member 52 forward and backward in the axial direction, so that the position of the zero point 62a on the graduated scale of the first inclination measuring instrument is aligned with the position of the datum line 52a. Thus, adjustment is carried out in such a manner that the position of the datum line 52a of the first inclination measuring instrument 50 indicates the zero point when the irradiating angle of the headlamp beam in the leftward and rightward directions is in its proper position.

Also, the position of the bubble may fail to agree with the position of the zero point 82a on the graduated scale 82 in some cases in the second inclination measuring instrument 70 due, for instance, to a deviation in the lamp mounting surface on the vehicle body, when the headlamp unit is installed on the vehicle body. In such a case, an adjustment is carried out in such a manner as to bring the bubble to the position of the zero point 82a on the graduated scale by turning the adjusting screw 30 (and also the tightening screw 78a, if necessary). Thus, an adjustment is made in such a way that the bubble in the leveling gauge 70, which is the second inclination measuring instrument, will indicate the zero point 82a on the graduated scale when the irradiating angle of the headlamp beam in the upward and downward directions is in its proper position.

After the above adjusting procedures have been effected, adjustment of the irradiating angle of the headlamp beam can be carried out by the user. That is, in the case the position of the datum line 52a of the first inclination measuring instrument 50 does not indicate the position of the zero point 62a on the graduated scale, or in the case the bubble in the leveling gauge 70, which is the second inclination measuring instrument, deviates from the position of the zero point 82a on the graduated scale, by viewing the graduated scale by looking into the interior region of the headlamp unit from a point above the side wall in the upper part of the front lens 6, it is possible to determine the amount of inclination of the lamp body in the leftward and rightward directions or in the upward and downward directions, that is, the amount of deviation of the irradiating angle of the headlamp beam in the leftward and rightward directions or in the upward and downward directions of the headlamp unit, on the basis of the deviations so read. In such a case, moreover, an adjustment can be made in such a way that the position of the zero point 62a on the graduated scale will align with the position of the datum line 52a in the first inclination measuring instrument 50, and in such a way that the bubble is aligned with the zero point 82a on the graduated scale in the leveling gauge 70 by turning the adjusting screw 20 or 30, respectively. With adjusting operations performed in this manner, it is easily possible to adjust the irradiating angle of the headlamp beam in the leftward and rightward directions or in the upward and downward directions.

Figure 10:
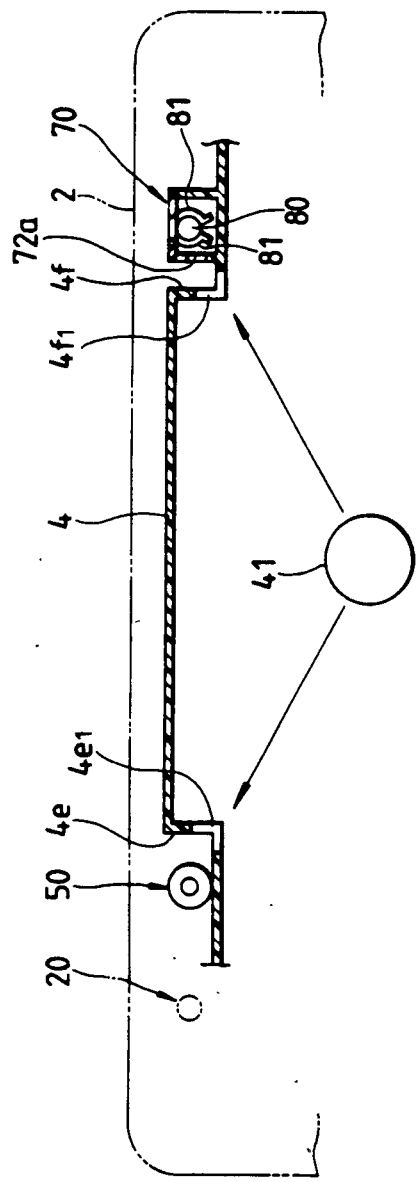
FIGS. 10 and 11 respectively illustrate third and fourth embodiments of the invention, FIG. 10 being a front view of the headlamp with the lamp body illustrated in section and FIG. 11 being an enlarged perspective view of principal parts thereof.

FIG. 10 illustrates a third embodiment of the present invention, and is a front view of the headlamp unit showing the lamp body in section.

In this figure, reference numeral 4e indicates an upright wall positioned between the first inclination measuring instrument 50 and the bulb 41 and forming a part of the reflector 4. An opening $4e_1$ is formed in the position of this upright wall 4e located opposite the inclination measuring instrument 50. Further, some part of the light reflected from the reflector 4 is led out of the reflector 4 via this opening $4e_1$ and irradiated on the side area of the inclination measuring instrument 50. Owing to this feature, the area in the forward end part of the supporting member 52 in the inclination measuring instrument 50 is illuminated brightly, which offers convenience in the reading of the graduations on the scale.

Reference numeral 4f indicates an upright wall positioned between the leveling gauge 70, which is the second inclination measuring instrument, and the bulb 41 and forming a part of the reflector 4. An opening 4f₁ is formed also in the position of this upright wall 4f located opposite the leveling gauge 70. Further, an opening 72a is formed also in the area opposite the opening 4f₁ and opposite the side area of the bubble vial in the casing 72. With this construction, some part of the light in the inside region of the reflector 4 is led to the outside of the reflector via the opening 4f₁ on the side of the reflector and irradiated onto the side of the bubble vial 80 via the opening 72a in the casing. Owing to this feature, the light is reflected in a diffuse manner on the surface of the bubble in the bubble vial 80, so that the position of the bubble can be viewed under favorable illuminating conditions and the graduated scale can be read with greater ease.

Figure 11:
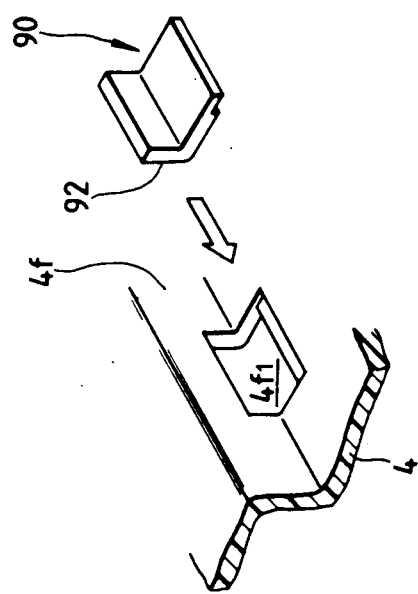

FIG. 11 illustrates principal parts of a fourth embodiment of the invention, wherein a half-silvered mirror area for conducting light to the leveling gauge, which is the second inclination measuring instrument, is formed in the prescribed area in the reflector. Specifically, an opening 4f₁ as shown in FIG. 10 is formed in the upright wall 4f of the reflector, and a half-silvered mirror 90 is formed integrally with the opening 4f₁ by an appropriate technique such as fusion. The half-silvered mirror 90 is formed by vaporizing an aluminum coating 92 onto the inside area of the transparent polycarbonate material in a shape fitting the opening 4f₁ of the reflector, the coating 92 being a thin film which reflects some part of the light but transmits the rest of the light.

Figure 12:
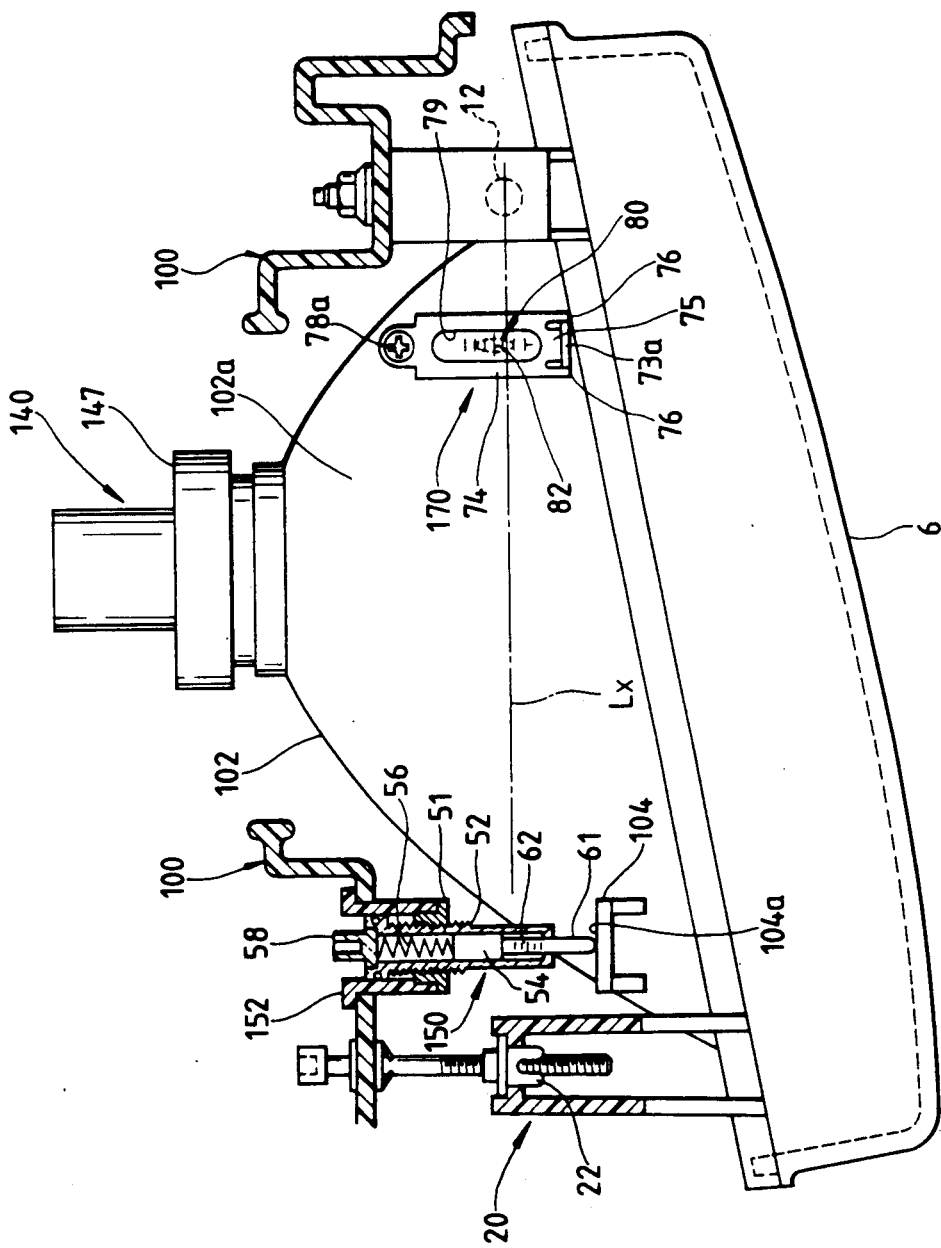
FIG. 12 is a horizontal sectional view of the headlamp illustrating an example wherein the present invention is applied to a headlamp of the movable unit type.

FIG. 12 illustrates an arrangement in which the present invention is applied to a movable unit type headlamp.

The first inclination measuring instrument 150, which measures the inclination of the lamp body in the leftward and rightward directions, and the leveling gauge 170, which is the second inclination measuring instrument for measuring the inclination of the lamp body in the upward and downward directions, are mounted in the horizontal plane including the horizontal swinging axis Lx of the wall 102a in the upper area of the lamp body 102. The first inclination measuring instrument 150 is mounted by way of a supporting member 152 on the vehicle body side mounting surface 100 for the headlamp unit, and a rod member 54 with graduations indicated thereon is set in direct contact, under force applied thereto, with the upright wall 104 formed with a protrusion on the upper area wall 102a of the lamp body. For making such direct contact with the area 104a of the upright wall 104, the smaller diameter part 61 of the rod is formed into a curved surface with its center positioned on the horizontal axis Lx in such a manner that this area cannot influence the tilting motion of the lamp body in the upward and downward directions. Moreover, the casing for the leveling gauge 170, which is the second inclination measuring instrument, is formed as an integrated unit with the wall 102a in the upper area of the lamp body, and the areas for reading the graduations on the first and second inclination measuring instruments are in such positions as will offer greater ease in reading the graduated scale from a point above the side area of the headlamp unit. Reference numeral 140 indicates the bulb socket, and reference numeral 147 a locking cap for firmly holding the bulb socket 140 in the socket hole.

The remainder of the construction is the same as that of the movable lamp body described above, and hence a further description thereof will be omitted, like parts being indicated with like reference numerals.

Figure 13:
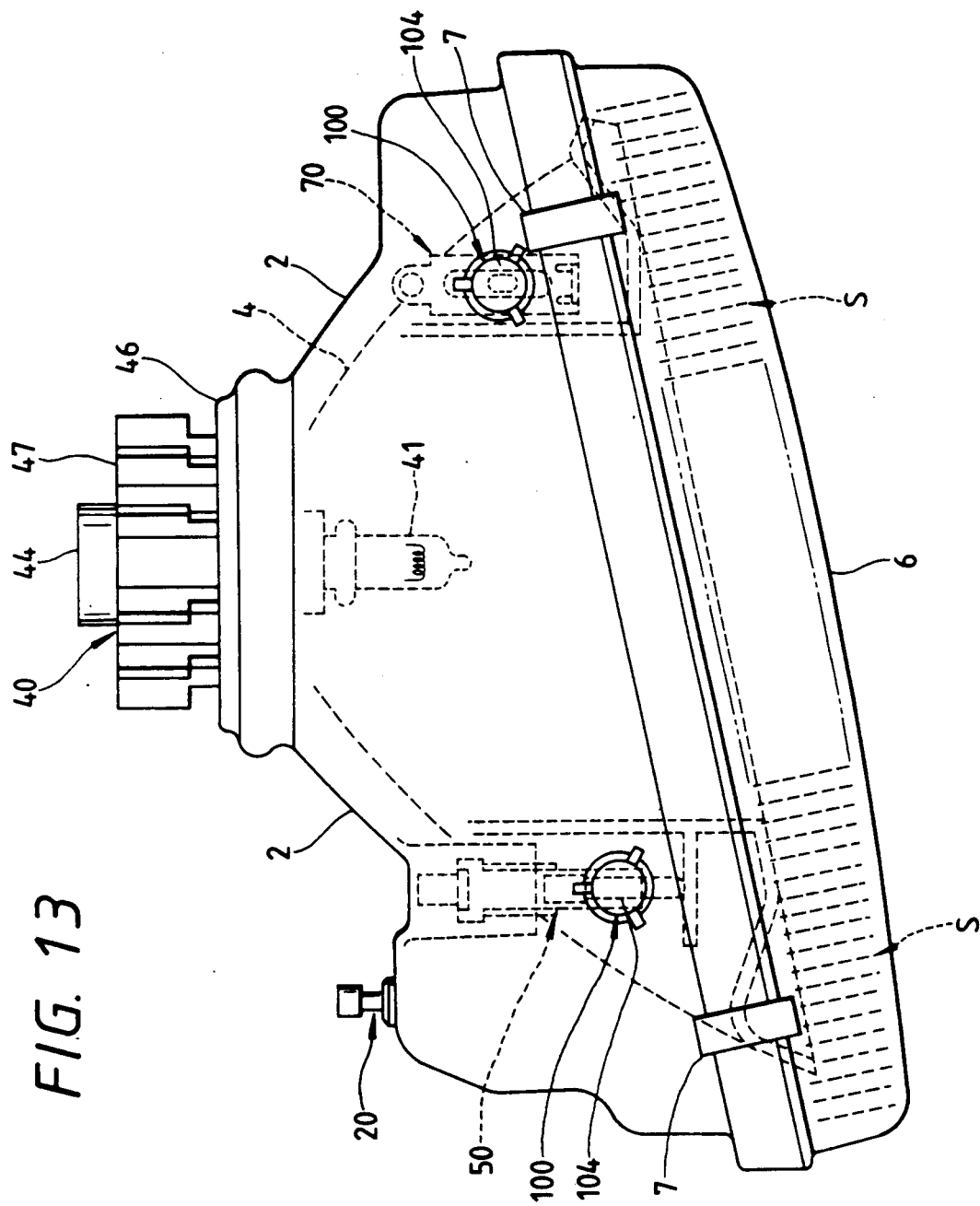
FIG. 13 is a plane view of the headlamp equipped with a built-in irradiating angle adjusting device according to the fourth embodiment of the invention.
Figure 14:
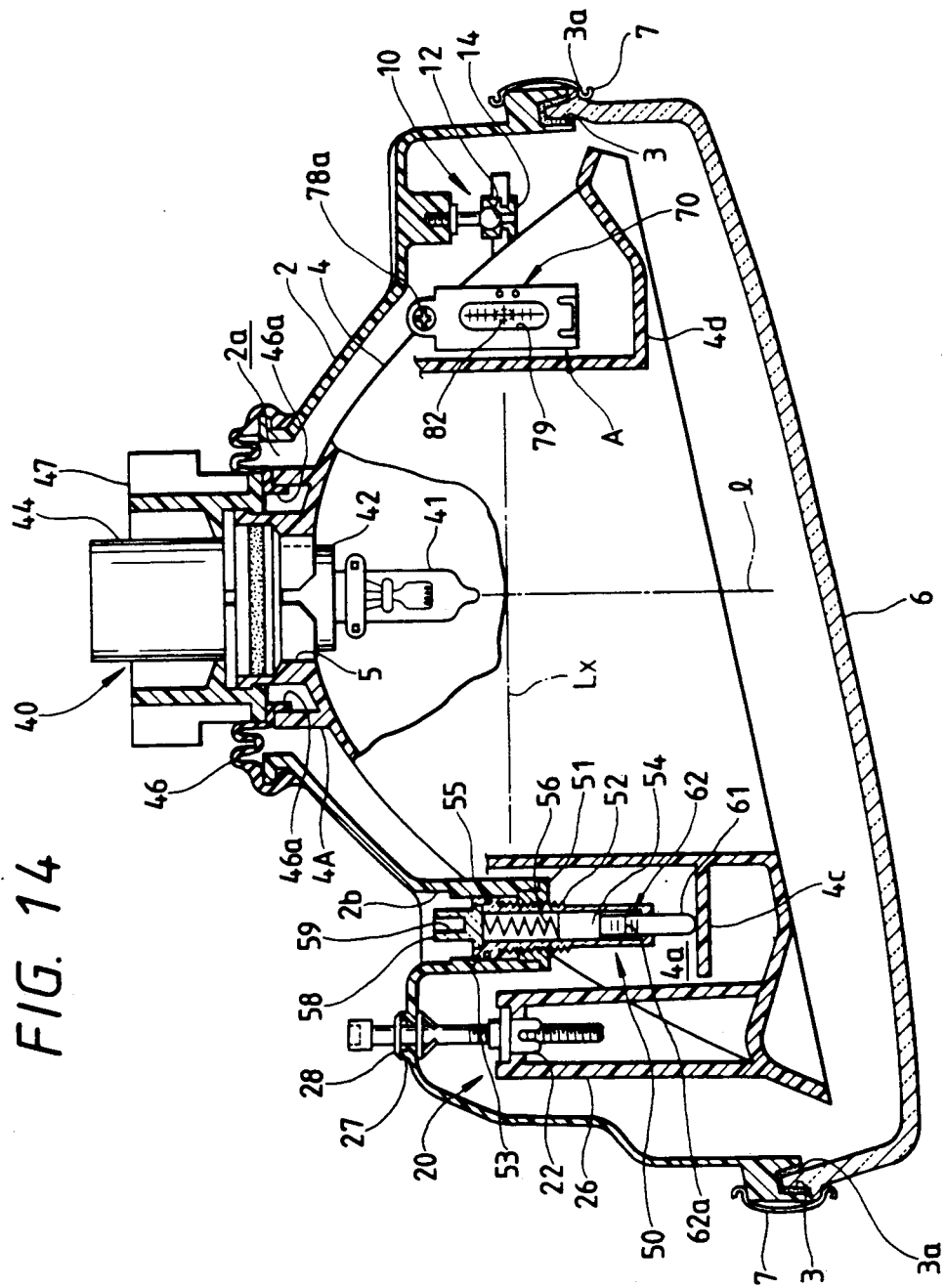
FIG. 14 is a partially cut-away horizontal sectional view illustrating selected parts of the fourth embodiment.
Figure 15:
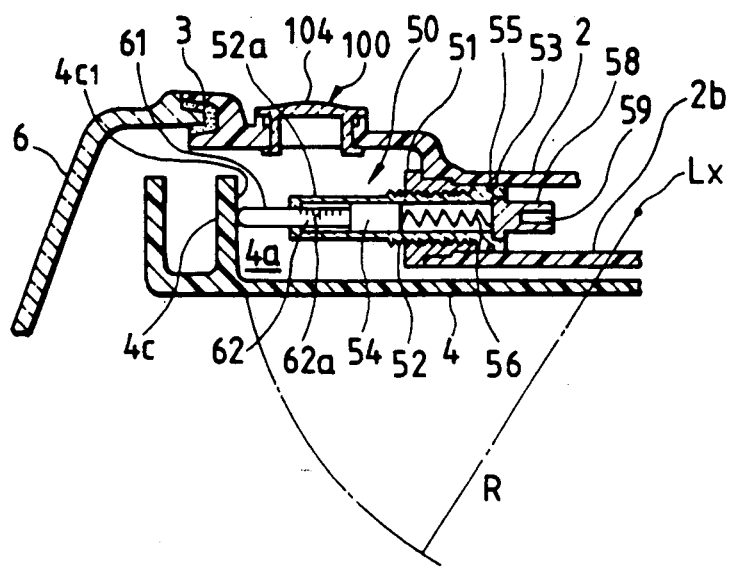
FIG. 15 is a vertical sectional view of a inclination measuring instrument which measures the inclination of the irradiating direction of the headlamp beam in leftward and rightward directions.
Figure 16:
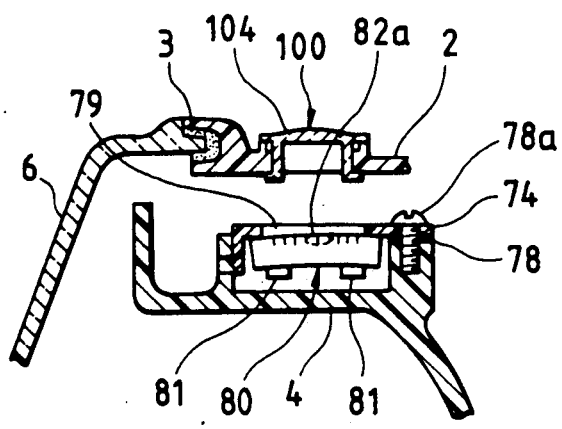
FIG. 16 is a vertical sectional view of mounting part of the leveling gauge, which is a measuring instrument for measuring the inclination of the irradiating direction of the headlamp in the upward and downward directions.
Figure 17:
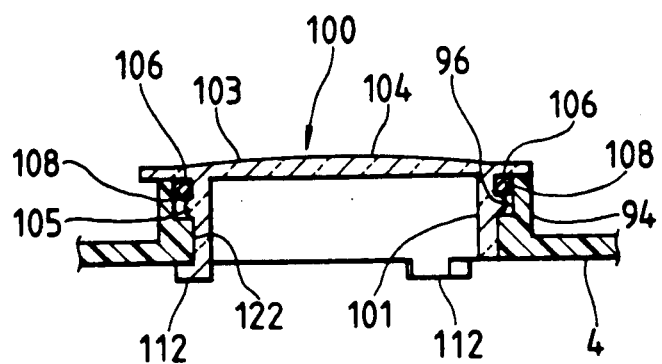
FIG. 17 is a vertical sectional view illustrating an opening formed in the lamp body area corresponding to the position for reading of the graduations on the first and second inclination measuring instruments, and a transparent cap provided with an observation window and installed in the opening.
Figure 18:
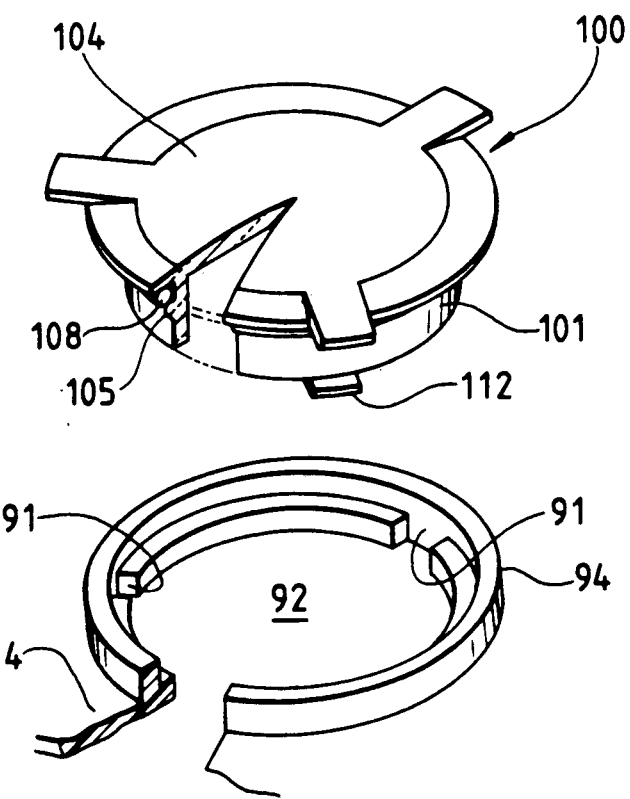
FIG. 18 is a perspective view of the opening on the side of the lamp body and the transparent cap provided with an observation window, both as disassembled.

FIGS. 13 through 18 illustrate a motor vehicle headlamp of the movable reflector type constructed according to a fifth embodiment of the present invention. FIG. 13 is a plane view of the headlamp equipped with a built-in irradiating angle adjusting device. FIG. 14 is a partially cut-away horizontal sectional view illustrating some parts of the same. FIG. 15 is a vertical sectional view of an inclination measuring instrument which measures the inclination of the irradiating direction of the headlamp beam in leftward and rightward directions. FIG. 16 is a vertical sectional view of the mounting part of the leveling gauge, which is a measuring instrument for measuring the inclination of the irradiating direction of the headlamp beam in the upward and downward directions. FIG. 17 is a vertical sectional view illustrating an opening in the lamp body area corresponding to the position for reading the graduations on the first and second inclination measuring instruments and the transparent cap provided with an observation window and set in this opening. In these figures, like components as in the first embodiment are indicated by like reference numerals.

In these figures, reference numeral 2 represents a boat-shaped lamp body with a reflector 4 mounted therein and a front lens 6 installed in the rectangular front opening of the lamp body 2. These components are assembled together into an integrated headlamp unit.

The reflector 4 is supported at three points with a ball joint 10 and adjusting screws 20 and 30, as illustrated in FIG. 14. The spherical part 12 of the ball joint 10 is supported on the side of the lamp body 2, and the reflector 4 is installed so as to be swingable around the ball joint 10 as the center of its motion. Both of the adjusting screws 20 and 30 are supported on the lamp body 2 in such a manner as to permit their free turning motion. Also, the screws are screwed into respective nuts 22 and 32 provided on the side of the reflector 4 whereby the nuts 22 and 32 are moved forward and backward along the adjusting screws 20 and 30 when the adjusting screws 20 and 30 are turned, thereby adjusting the inclination of the reflector 4.

Reference numeral 14 indicates a socket which bears the spherical part 12, which socket is firmly fit and supported in a bracket 16 fixed on the back surface of the reflector 4. Reference numerals 22 and 32 indicate nuts with which the adjusting screws 20 and 30 are threadedly engaged. The nuts are supported by brackets 26 and 36 fixed on the back surface of the reflector 4. Reference numerals 24 and 34 denote compression coil springs, reference numerals 27 and 37 indicate O-rings, and reference numerals 28 and 38 represent flange parts formed as protrusions on the adjusting screws 20 and 30.

The supporting point for the reflector 4 with the adjusting screw 20 (i.e., the threadedly engaged portions of the adjusting screw 20 and the nut 22) crosses the optical axis l of the bulb 41 at right angles (as will be described in more detail below), and also is positioned on the horizontal axis Lx, which passes through the bal joint 10. The supporting point for the reflector 4 with the adjusting screw 30 (i.e., the threadedly engaged portions of the adjusting screw 30 and the nut 32) crosses the optical axis 1 at right angles and is also positioned on the vertical axis Ly, which passes through the ball joint 10. Therefore, the reflector 4 swings around the vertical axis Ly when the adjusting screw 20 is turned. Accordingly, it is possible to adjust the inclination of the reflector 4 in the leftward and rightward directions, whereby the irradiating angle of the headlamp beam can be adjusted in leftward and rightward directions. Turning the adjusting screw 30 makes the reflector 4 swing around the horizontal axis Lx which crosses the vertical axis Ly at right angles, thereby making it possible to adjust the inclination of the reflector 4 in upward and downward directions, that is, the irradiating angle of the headlamp beam can thus be adjusted in upward and downward directions. Thus, with the two adjusting screws 20 and 30, adjustments can be made of the tilting movement of the reflector 4, and hence the irradiating angle of the headlamp beam.

Also in FIG. 14, reference numeral 40 indicates a bulb socket, which forms an integrated unit with the bulb 41 connected therewith. On the back area of the lamp body 2 is formed an opening 2a for the installation and removal of the bulb socket, and the bulb socket 40 is passed through this opening 2a on the back area of the lamp body and is fit into the socket hole 5 formed on the rear top part of the reflector 4. On the outer circumference of the rear top part of the reflector 4, a cover 46 made of rubber closes the opening between the reflector 4 and the lamp body 2, and, by the effect of the locking cap 47 provided on the outer circumference of the bulb socket 40, the bulb socket 40 is held under pressure in the socket hole 5 of the lamp body. Also, the inner circumferential rim 46a of the rubber cover 46 is kept in close contact under pressure with the circumferential wall 4a in the rear area of the lamp body.

Reference numeral 42 indicates a metal socket in which the bulb 41 is to be set, and reference numeral 44 represents a cylindrically shaped connector with a connecting terminal provided therein.

Furthermore, in FIG. 14 reference numeral 3 indicates a sealing groove formed in the circumferential rim of the opening in the front area of the lamp body 2. With a sealing agent 3a filled in this sealing groove 3, the setting clamps of the front lens 6 are connected to the lamp body. Reference numeral 7 in FIG. 13 represents clips which mechanically join together the front lens 6 and the lamp body 2. Reference numeral S designates a diffusing step formed on the inner circumferential area of the side wall of the front lens 6, which diffusing step S serves the purpose of rendering inconspicuous the light leaking from the side of the front lens 6.

In FIGS. 13, 14 and 15, reference numeral 50 represents the first inclination measuring instrument which is mounted in the horizontal plane including the horizontal axis Lx and which measures the inclination of the reflector 4 in the leftward and rightward directions, i.e., the inclination of the irradiating angle of the headlamp beam in the leftward and rightward directions. In the inside area of the lamp body 2, a cylindrically shaped protruding part 2b forming an integrated structure with the lamp body protrudes towards the reflector 4, extending over the concave part 4a formed in the area of the corner part on the left side of the wall in the upper area of the reflector 4. The inclination measuring instrument 50 is installed and arranged parallel to the optical axis 1 on this protruding part 2b of the lamp body. The inclination measuring instrument 50 is composed of a cylindrically shaped supporting member 52, a rod member 54 inserted into the inside area of the supporting member 52, and a compression coil spring 56, which is positioned inside the supporting member 52 and applies a force in the forward direction of the rod member 54.

A screw 51 is rigidly fixed on the forward end of the protruding part of the lamp body, and a transparent supporting member 52 made of synthetic resin is threadedly engaged with the screw 51. On the end part of the supporting member 52 is formed an expanded diameter part 53. An O-ring 55, which seals the surface for sliding motion with the protruding part 2b of the lamp body, is set on the outer circumference of the expanded diameter part 53. Also, on the expanded diameter part 53 is formed a cap 58 with a driver fitting part 59 formed thereon by fusion in an integrated structure with the supporting member 52. The position of the supporting member 52 can be moved forward and backward in the axial direction for adjustment thereof in relation to the lamp body 2 by turning the supporting member 52 with a screwdriver (not illustrated) in relation to the screw 51.

The rod member 54 inserted through the supporting member 52 is formed with steps. The rod directly contacts the back area of the upright wall 4c of the reflector 4 under a force applied thereto, the small diameter part 61 of the rod protruding forward by the action of the compression coil spring 56. A circumferential datum line 52a (FIG. 15) is inscribed on the outer circumference of the forward end of the transparent supporting member 52, while straight-line graduations 62 are indicated in the axial direction on the small diameter part 61 of the rod. Thus, as the rod member 54 slides forward and backward in the axial direction as the reflector 4 swings around the vertical axis Ly, the position of the datum line 52a varies with respect to the graduations.

The surface $4c_1$ of the upright wall 4c with which the small diameter part of the rod directly contacts is formed with a curved surface with a radius R centered around the horizontal axis Lx, as illustrated in FIG. 15. Thus, the reading on the graduated scale of the first inclination measuring instrument 50 is prevented from being affected by tilting movement of the lamp body in the upward and downward directions. Thus, the inclination measuring instrument is set in such a way that the zero point 62a on the graduated scale 62 aligns with the position of the datum line 52a when the inclination of the reflector 4 in the leftward and rightward directions is proper. Consequently, the datum line 52a correctly indicates the amount of inclination of the reflector 4 in the leftward and rightward directions.

On the wall in the upper area of the lamp body in correspondence to the position of the datum line 52a, which is thus the point for reading the graduated scale, a circular opening 92 is formed, as shown in FIG. 17, and a transparent cap 100 is placed over this opening 92. The transparent cap 100 is cylindrical in form, and an observation window having a convex lens construction with its top area formed into a spherical shape is formed in the cover area of the cap. When the operator looks into the observation window while the cap 100 is set in the opening 92, the graduations on the inclination measuring instrument 50 are magnified, offering ease in reading the graduations.

On the outer circumference of the cylindrical part 101 of the transparent cap 100, an O-ring setting groove 106 is formed with the horizontal rib 105, and the O-ring 108 is set in this groove. An upright wall 94 is formed on the circumference of the opening 92, and a concave part 96 adapted to fit with the horizontal rib 105 on the side of the transparent cap is formed on the inner circumferential area of the upright wall 94, with the O-ring 108 being set between the transparent cap 100 and the inner circumferential area of the upright wall 94, providing a secure seal to the fitting part. Also, three equally spaced rectangularly shaped protrusions 122 are formed along the circumferential rim of the forward end of the cylindrical part 101 of the transparent cap 100. Corresponding notches in a rectangular shape, with which the protrusions 122 on the cap side are to be joined, are formed on the circumferential rim of the opening 92. The transparent cap 100 is thus secured in the opening 92 with a bayonet connection by fitting the protrusions 122 into the notches 91.

In FIGS. 13 through 15 and 16, reference numeral 70 represents the leveling gauge, which is the second inclination measuring instrument for measuring the inclination of the reflector 4 in the upward and downward directions, i.e., the inclination of the irradiating angle of the headlamp beam in the upward and downward directions. The leveling gauge 70 includes a straight-line type bubble vial 80 accommodated in a casing 72 formed for the leveling gauge in the wall in the upper area of the reflector 4. Reference numeral 82 indicates the graduations on the bubble vial, and reference numeral 82a represents the position of the zero point on the graduated scale. Reference numeral 74 denotes the opening in the casing 72, the area of the bubble vial 80 where the graduations are indicated being exposed to sight through this opening 74. The bubble vial 80 is arranged inside the casing 72 in such a manner that the graduated scale provided on the bubble vial crosses at right angles with the horizontal axis Lx in the inside area of the casing 72, forming a construction which indicates the amount of tilt of the reflector 4 by the amount of deviation of the bubble from the reference point on the graduated scale. Reference numeral 78a indicates a vertical tightening screw with which the position of the bubble in the bubble vial 80 can be adjusted by turning the screw 78a.

An opening 92 on the side of the lamp body and a transparent cap 100 set on the opening 92, both having the identical construction to their counterparts on the side of the first inclination measuring instrument 50 described above, are also provided in the area corresponding to the leveling gauge 70 in the wall in the upper area of the lamp body. Due to the convex lens effect of the observation window 104 forming the cover area of the transparent cap 100, the bubble in the bubble vial 80 and the graduated scale on the bubble vial 80 appear in magnified size, which makes it easy to read the position of the bubble, i.e., to read the amount of inclination of the reflector 4 in the upward and downward directions through the observation window 104.

Next, a description will be given of the procedure to be carried out to adjust the inclination measuring instrument when the headlamp unit is mounted on a vehicle body, and the procedure to be effected thereafter for the adjustment of the irradiating angle of the headlamp beam.

The headlamp unit is set in such a manner that the characteristics of the light distribution of the headlamp unit in the leftward and rightward directions will be in the proper position when the position of the zero point 62a on the graduated scale on the rod member 54 of the first inclination measuring instrument 50 is aligned with the position of the datum line 52a, and that the characteristics of the light distribution of the headlamp unit in the upward and downward directions will be in the proper position when the bubble in the leveling gauge 70, which is the second inclination measuring instrument, aligns with the position of the zero point 82a on the straight-line graduated scale 82.

When the headlamp unit bearing the first and second inclination measuring instruments is mounted on the vehicle body, it is likely that the indications on the graduated scales of the respective inclination measuring instruments will not be aligned with the proper position as the result of various errors. Therefore, it is necessary to adjust the graduations of the first and second inclination measuring instruments to set them in their proper states.

To carry out such adjustment, the vehicle body and an optical aimer are set face to face for the adjustment of the first inclination measuring instrument 50, and the optical axis l of the headlamp unit is made to align with the longitudinal axis of the vehicle by turning the adjusting screws 20 and 30. At this time, the position of the datum line 52a and the position of the zero point 62a on the graduated scale may not agree with each other in consequence of such factors as slight variations in the lamp mounting surface on the vehicle body. Therefore, the supporting member 52 is turned with a screwdriver driver, moving the supporting member 52 forward and backward in the axial direction until the position of the zero point 62a on the graduated scale of the first inclination measuring instrument is aligned with the position of the datum line 52a. In this manner, an adjustment is carried out in such a way that the position of the datum line 52a of the first inclination measuring instrument 50 indicates the zero point when the irradiating angle of the headlamp beam in the leftward and rightward directions is proper.

On the other hand, the position of the bubble may fail to agree with the position of the zero point 82a on the graduated scale 82 in some cases in the second inclination measuring instrument 70, due to slight deviations in the lamp mounting surface on the vehicle body, when the headlamp unit is assembled into the vehicle body. In such a case, an adjustment is effected so as to bring the bubble to the position of the zero point 82a on the graduated scale by turning the adjusting screw 30 (and also the tightening screw 78a if necessary). Thus, an adjustment is made in such a way that the bubble in the leveling gauge 70, which is the second inclination measuring instrument, indicates the zero point 82a on the graduated scale when the irradiating angle of the headlamp beam in the upward and downward directions is in its proper position.

After these adjusting procedures have been carried out, the adjustment of the irradiating angle of the headlamp beam can later readily be effected by the user. Thus, in case the position of the datum line 52a of the first inclination measuring instrument 50 does not indicate the position of the zero point 62a on the graduated scale, or in case the bubble in the leveling gauge 70, which is the second inclination measuring instrument, deviates from the position of the zero point 82a on the graduated scale, by observing the graduated scale by looking into the inside region of the headlamp unit from a point above the side wall in the upper part of the front lens 6, it is possible to determine the amount of inclination of the lamp body in the leftward and rightward directions or in the upward and downward directions, that is, the deviation of the irradiating angle of the headlamp beam in the leftward and rightward directions or in the upward and downward directions of the headlamp unit, on the basis of the amounts of deviation so read. In such a case, moreover, an adjustment can be easily be carried out so that the position of the zero point 62a on the graduated scale aligns with the position of the datum line 52a of the first inclination measuring instrument 50 and in such a way that the bubble is moved to the position of the zero point 82a on the graduated scale of the leveling gauge 70, which is the second inclination measuring instrument, by turning the respective adjusting screw 20 or 30. With adjusting operations performed in this manner, it is possible to adjust the irradiating angle of the headlamp beam in the leftward and rightward directions or in the upward and downward directions.

Figure 19:
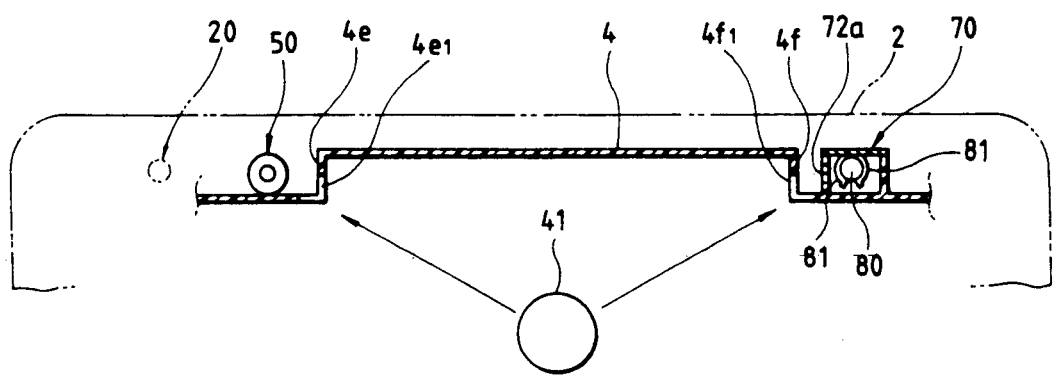
FIG. 19 is a front view of a headlamp according to a sixth embodiment of the invention with the lamp body shown in section.

FIG. 19 illustrates a sixth embodiment of the present invention, and is a front sectional view of the headlamp unit.

In this figure, reference numeral 4e indicates an upright wall positioned between the first inclination measuring instrument 50 and the bulb 41 and forming a part of the reflector 4. An opening 4e₁ is formed in the position of this upright wall 4e located opposite to the inclination measuring instrument 50. Some part of the light reflected from the reflector 4 is led out via this opening 4e₁ and irradiated on the side area of the inclination measuring instrument 50. Owing to this feature, the area in the forward end part of the supporting member 52 in the inclination measuring instrument 50 is illuminated brightly, which makes it possible to read the graduations on the scale even when it is dark in the measuring environment.

Reference numeral 4f indicates an upright wall which is positioned between the leveling gauge 70, i.e., the second inclination measuring instrument, and the bulb 41, and which forms a part of the reflector 4. An opening 4f₁ is formed in the position of this upright wall 4f located opposite to the leveling gauge 70. Furthermore, an opening 72a is formed in the area opposite to the opening 4f₁, and also opposite to the side area of the bubble vial in the casing 72, with the result that a construction is thereby provided wherein some part of the light in the inside region of the reflector 4 is led to the outside of the reflector 4 via the opening 4f₁ on the side of the reflector, thereby illuminating the side area of the bubble vial 80 via the opening 72a of the casing. Owing to this feature, the light is diffusely reflected on the surface of the bubble in the bubble vial 80 so that the position of the bubble can be readily visually recognized and the graduated scale can be read with sufficient clarity, even under dark conditions in the measuring environment.

Figure 20:
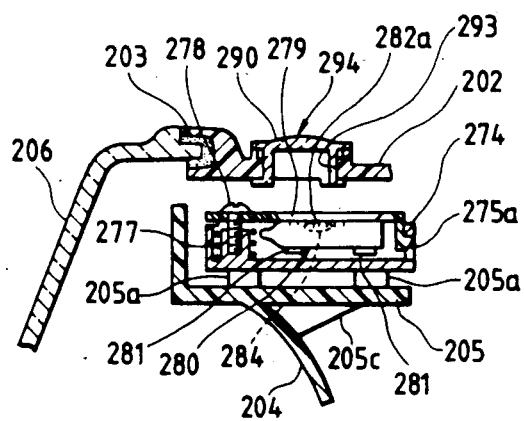
FIG. 20 is a vertical sectional drawing of principal parts in the area around the mounting part of the leveling gauge, which is the second inclination measuring instrument according to the seventh embodiment of the present invention.
Figure 21:
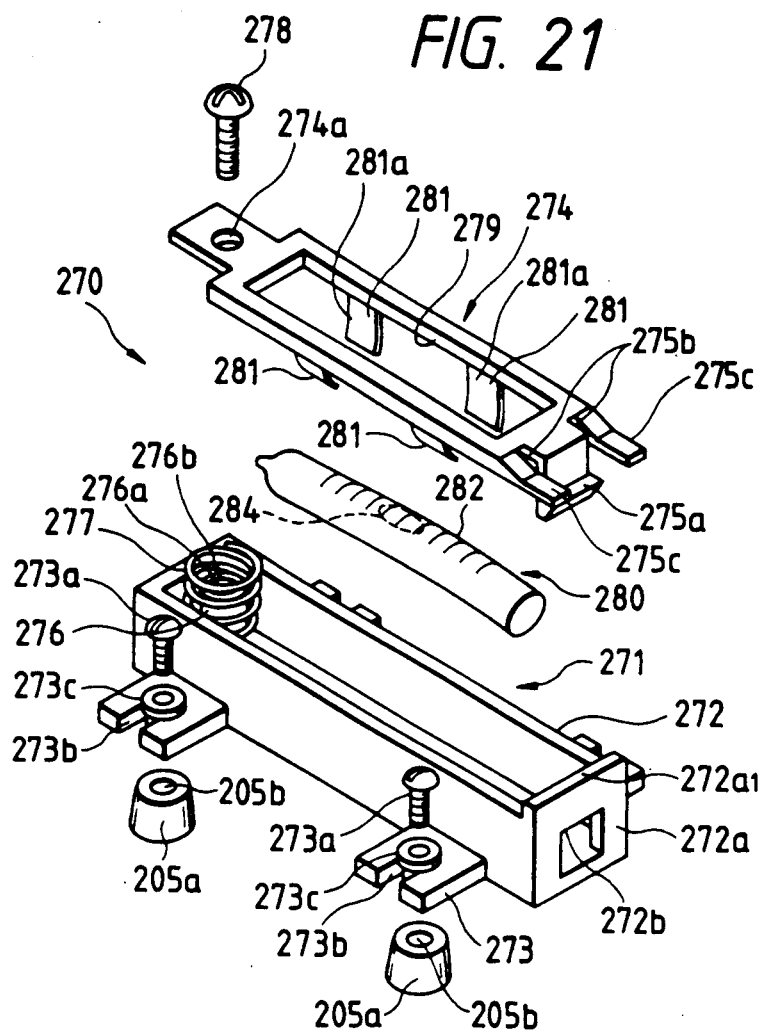
FIG. 21 is a perspective view of the leveling gauge as disassembled, which leveling gauge constitutes the second inclination measuring instrument.
Figure 22:
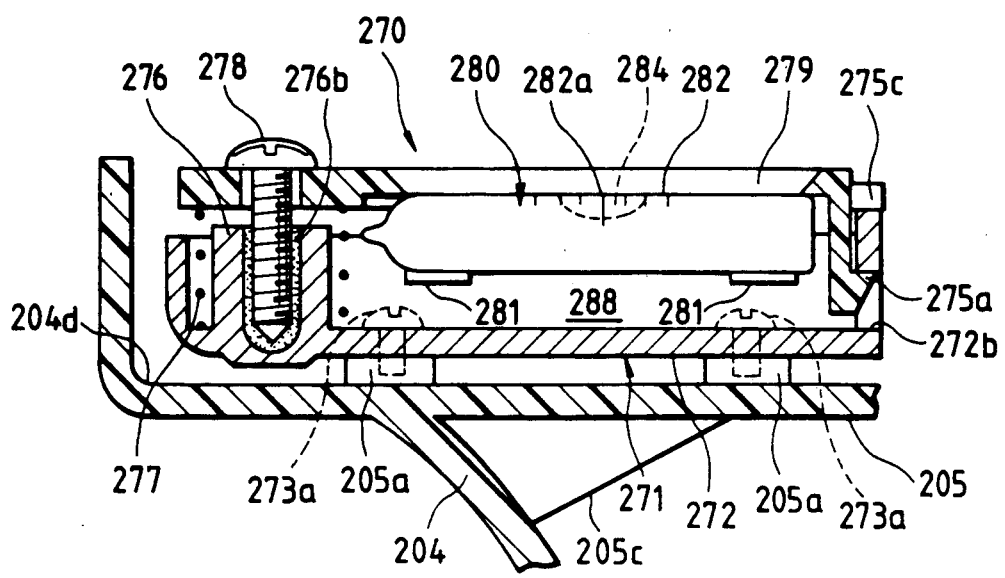
FIG. 22 is an enlarged vertical sectional view of the leveling gauge.

FIGS. 20 through 22 illustrate a seventh embodiment of the invention. This embodiment differs from the previously described embodiment with respect to the construction of the second inclination measuring instrument. In these figures, reference numeral 270 represents a leveling gauge, which is the second inclination measuring instrument for measuring the inclination of the reflector 204 in the upward and downward directions, namely, the inclination of the irradiating angle of the headlamp beam in the upward and downward directions. The leveling gauge 270 is installed in a concave part 204d formed in the corner area on the right side of the wall in the upper part of the reflector 204.

The leveling gauge 270 has an integrated construction formed with a straight-line type bubble vial 280 accommodated in the inside area of the leveling gauge casing 271. The leveling gauge 270 is mounted and fixed on the wall in the upper part of the reflector with four mounting screws 273a. The leveling gauge casing 271, which is made of die-cast aluminum with high thermal conductivity, is composed of a main casing unit 272 having a rectangular boat-like shape with an opening in the upper direction and four brackets 273 extending sideways from the main casing unit 272. The main casing unit 272 has a size large enough to accommodate a bubble vial 280, and has joint parts 273b which engage mounting screws 273a formed on the brackets 273. A backwardly extended part 205 is formed on the wall in the upper part of the reflector 204, and four bosses 205a, which act as a seat for bearing the leveling gauge, protrude from the extended part 205. A screw inserting hole 205b is formed in the upper end area of each boss 205a, and the bracket 273 is fixed by driving a mounting screw 273a into this hole. A ring-shaped rubber spacer 273c is placed in the joint part 273b of the bracket 273 so that the mounting screw 273a, which is made of iron, and the bracket 273, which is made of aluminum, will not be in direct contact, thus protecting the bracket 273 from corrosion caused by contact of dissimilar metals. Reference numeral 205c denotes a rib for reinforcing the extended part 205.

With the bracket 273 thus held on the boss 205a, the leveling gauge casing 271 is held spaced from the extended part 205. Owing to this feature, heat generated on the reflector side by the bulb 241 is not readily conducted to the casing 271 for the leveling gauge, and hence rises in temperature in the bubble vial 280 by the heat are thus suppressed. Moreover, for the purpose of reducing the number of component parts (the number of mounting screws 273a), and for the purpose of simplifying the mounting work for the leveling gauge 270, it is also possible to mount the leveling gauge 270 with only two mounting screws at diagonal positions.

In the opening in the upper area of the main casing unit 272, a cover 274 made of a highly elastic synthetic resin, such as U-polymer and polyacetal, with the bubble vial 280 installed on its back, is mounted rigidly by an indented lance coupling and tightening screws. That is to say, on the side wall area 272a on the rear side of the main casing unit 272, a rectangular opening 272b is formed while a hook 275a, which protrudes perpendicularly downward and engages with the opening 272b, is formed on the side of the casing mentioned above on the rear end of the main casing unit 272. In the rear end part of the cover, a pair of suspending parts 275c are formed in an extended structure on both sides of the hook 275c across the slit 275b. When the hook 275a is engaged in the opening 272b in the state wherein the hook suspending part 275c is in direct contact with the upper end surface 272a₁ in the side wall area on the rear side of the casing, the suspending part 275c and the hook 275a respectively undergo elastic deformation in mutually reverse directions in the manner of a cantilevered beam so that the rear end part of the cover is held in such a way as to prevent its falling out in the upward and downward directions and also held elastically in the upward and downward directions, as illustrated in FIG. 22. Thus, between the rear end part of the cover and the side wall 273a on the rear side of the casing is formed an indented elastic lance coupling, which is composed of an opening 272b, a hook 275a, and a suspending part 275c, for securing and also elastically supporting the rear end part of the cover.

A screw inserting hole 274a is formed in the front end part of the cover 274, and a boss 276 with a screw hole 276a therein is formed in a protruding structure in a position in the front area of the main casing unit 272. A compression coil spring 277 is arranged in the periphery of the boss 276, and the forward end part of the cover and the boss 276 are tightened together with the adjusting screw 278. The forward end part of the cover is thereby supported elastically in the upward and downward directions in relation to the main casing unit 272.

Reference numeral 276b represents rubber material coated on the inner circumferential surface of the screw hole 276a. Corrosion of the boss 276 is prevented by thus avoiding direct contact between the adjusting screw 278, which is made of iron, and the boss 276, which is made of aluminum. Through adjustment of the adjusting screw 278, it is possible to adjust the inclination of the cover 274, namely, the inclination of the bubble vial 280.

On the back side of the cover 274, a straight-line type bubble vial 280 is mounted with a clasping piece 281. The surface of the bubble vial 280 with the graduations 282 indicated thereon is exposed to view through a rectangular window 279 in the central area of the cover. Reference numeral 282a indicates the position of the zero point on the graduated scale. The clasping piece 281, which is a spring member for clasping the bubble vial 280 to hold it in place, is provided in a unified structure with the cover 274 and is constructed so as to clasp the outer circumferential area of the bubble vial 280 at the curved surface indicated by reference numeral 281a. The bubble vial 280 is thus supported in a suspended state with the clasping piece 281 of the cover 274. A heat insulating air layer 288 is thus formed between the main casing unit 272 and the bubble vial 280, which construction produces the effect that heat on the casing side is not readily conducted to the bubble vial 280.

In order to install the bubble vial 280 on the clasping piece 281, the bubble vial 280 can be set and fixed with a single movement in the cover 274 by inserting the bubble vial 280 from the forward end side of the clasping piece 281.

When the bulb 241 is lit, the heat which is generated by the bulb 241 is conducted to the leveling gauge casing 271 by way of the reflector 204, the extended part 205, and the boss 205a, which have a low thermal conductivity, and the heat is conducted further to the bubble vial 280. The amount of heat conducted to the main casing unit 272 is in an amount in inverse proportion to the length of the heat conduction path, with the result that there arise differences in the amount of heat conduction among the individual areas in the main casing unit 272. However, since the main casing unit 272 is made of aluminum with high thermal conductivity, the differences in the amount of heat conduction in the various areas are smoothed and thus reduced in the main casing unit. In other words, the differences in the temperatures of the different areas of the main casing unit 272 are reduced because the main casing unit 272 having a high thermal conductivity conducts approximately the same amount of heat to those areas reached over a longer heat conduction path as to those areas with lower thermal conductivity. Furthermore, because the bubble vial 280 is suspended in the main casing unit 272 with the clasping piece 281, a heat-insulating air layer 288 is present between the main casing unit 272 and the bubble vial 280. This heat insulating air layer 288 cuts off the heat conducted to the bubble vial 280 via the main casing unit 272, thereby producing a further smoothing effect. In specific terms, the heat smoothed out in the main casing unit 272 is cut off from further conduction and smoothed out by the heat insulating air layer 288 before reaching the bubble vial 280. Consequently, the amount of heat conducted to the bubble vial 280 is made uniform in the longitudinal direction, with the result that the differences in temperature will be minimal in the forward and rear end parts of the bubble vial 280. Therefore, convection does not occur inside the bubble vial 280, and thus there will be scarcely any movement of the bubble due to thermal effects.

Next, the installation of the leveling gauge on the reflector 204 will be described with reference to FIG. 21.

First, the bubble vial 280 is assembled into the cover 274 by setting the bubble vial in the clasping piece 281 to be held therein. Next, the rear end part of the cover 274 is joined by lance coupling to the side wall 273a on the rear end of the casing, and also the forward end part of the cover is tightened onto the boss 276 with the adjusting screw 278, so that these members are joined in an integrated structure as the leveling gauge 270. Then, with the bracket 273 of the casing 271 aligned for proper positioning on the boss 205a on the reflector side, the bracket 273 is fastened to the boss 205a with the mounting screw 273a. Subsequently, after the completion of the installation of the leveling gauge 270 on the wall in the upper area of the reflector 204, adjustments are made of the inclination of the reflector 204 in the upward and downward directions with the adjusting screw 278 in such a manner that the bubble 284 in the leveling gauge 270 is set at the position of the zero point 282a on the straight-line graduated scale when the irradiating angle of the headlamp beam is proper in the upward and downward directions. Also, as illustrated in FIG. 20, an opening 293 is formed in the area corresponding to the leveling gauge 270 in the lamp body 202, which opening is aligned with an observation window 290 for reading the graduations on the scale to make it is possible to read the inclination indicated on the leveling gauge 270 through the observation window 290.

The remainder of the construction of the headlamp of this embodiment, including the first inclination measuring instrument 50, is the same as the preceding embodiment, and hence a further detailed description thereof will be omitted.

Next, a description will be given of the procedure for adjusting the inclination measuring instruments 50 and 270 when the headlamp unit is mounted on a vehicle body, and the procedure thereafter for adjusting the irradiating angle of the headlamp beam.

The headlamp as a single unit is set in such a way that the light distribution characteristics of the headlamp unit in the leftward and rightward directions will be in the proper position when the position of the zero point 62a on the graduated scale on the rod member 54 in the first inclination measuring instrument 50 is aligned with the datum line 52a, and that the light distribution characteristics of the headlamp unit in the upward and downward directions will be in the proper position when the bubble 284 in the leveling gauge 270, which is the second inclination measuring instrument, is at the zero point 282a on the straight-line graduated scale 282 of the gauge 270.

Then, when the headlamp unit with these first and second inclination measuring instruments 50 and 270 incorporated therein is installed on a vehicle body, the indications on the graduated scales in the respective inclination measuring instruments will generally not be at the proper positions in consequence of various errors. Therefore, it is necessary to make adjustments of the graduated scales in the first and second inclination measuring instruments so as to set them in their proper condition.

In the case of the first inclination measuring instrument 50, the vehicle body is positioned on a flat and level surface, a light distribution screen is set in the prescribed position in the forward area of the motor vehicle, and the headlamp is turned on. Then, adjustments are made by turning the adjusting screw 20 in such a manner that the distribution of light from the headlamp will be in the prescribed positions in the leftward and rightward directions on the light distribution screen (i.e., in such a way that the irradiating axis 1 of the headlamp beam is made to agree with the longitudinal axis of the motor vehicle). At such a time, however, the position of the datum line 52a and the position of the zero point 262a on the graduated scale will generally not agree with each other in consequence of such factors as deviations in the lamp mounting surface on the vehicle body side. Therefore, the supporting member 52 is turned with a screwdriver, moving the supporting member 52 forward and backward in the axial direction until the position of the zero point 62a on the graduated scale in the first inclination measuring instrument is aligned with the datum line 52a. Thus, an adjustment is made in such a way that the position of the datum line 52a in the first inclination measuring instrument 50 indicates the zero point when the irradiating angle of the headlamp beam in the leftward and rightward directions is proper.

On the other hand, in the case of the leveling gauge 270, which is the second inclination measuring instrument, adjustments are carried out by turning the adjusting screw 30 in such a manner that the "hot zone" of the headlamp unit is set at the prescribed position in the upward and downward directions on the light distribution screen. The position of the bubble may fail to agree with the position of the zero point 282a on the graduated scale 282 in some cases due to a deviation in the lamp mounting surface on the vehicle body side. In such a case, an adjustment is made to bring the bubble to the position of the zero point 282a on the graduated scale by turning the adjusting screw 278. Thus, an adjustment is made in such a way that the bubble in the leveling gauge 270, which is the second inclination measuring instrument, will properly indicate the zero point 282a on the graduated scale when the irradiating angle of the headlamp beam in the upward and downward directions is set in its proper position.

After these adjusting procedures have been carried out, the adjustment of the irradiating angle of the headlamp beam is effected at the user's side. Subsequently, in case the position of the datum line 52a in the first inclination measuring instrument 50 does not indicate the position of the zero point 62a on the graduated scale, or in case the bubble in the leveling gauge 270, which is the second inclination measuring instrument, deviates from the position of the zero point 282a on the graduated scale when the graduated scale is read by looking into the interior of the headlamp unit from a point above the side wall in the upper part of the lens 206 in the front part of the headlamp unit, it is possible to determine the amount of inclination of the lamp body in the leftward and rightward directions or in the upward and downward directions, that is, the deviation of the irradiating angle of the headlamp beam in the leftward and rightward directions or in the upward and downward directions of the headlamp unit, on the basis of the amounts of deviation so read. In such cases, adjustment is made in such a manner that the position of the zero point 62a on the graduated scale will be aligned with the position of the datum line 52a in the first inclination measuring instrument 50, and in such a way that the bubble is set to the position of the zero point 282a on the graduated scale in the leveling gauge 270, which is the second inclination measuring instrument, by turning the adjusting screw 20 or 30, respectively. With adjusting operations performed in this manner, it is possible to make adjustments of the irradiating angle of the headlamp beam in the leftward and rightward directions or in the upward and downward directions.

As it is evident from the description above, the motor vehicle headlamp according to the present invention indicates on the leveling gauge the inclination of the reflector (the lamp body in the movable unit type) in the upward and downward directions, and thus makes it possible to read from the leveling gauge the amount of inclination of the reflector (the lamp body in the case of the movable unit type) in the upward and downward directions, namely, the amount of inclination of the irradiating angle of tl.e headlamp beam in the upward and downward directions.

The leveling gauge is provided on the wall in the upper area of the reflector (on the lamp body in the case of the movable unit type), and, particularly in the case of the headlamp of the movable lamp body type, it is possible to read the graduated scale of the leveling gauge through the outer side wall in the upper area of the front lens.

Moreover, for the adjustment of the irradiating angle of the headlamp beam, this headlamp permits any person to easily adjust the irradiating angle of the headlamp beam in the upward and downward directions since it is sufficient to make the aiming adjustment by moving the reflector (or the lamp body in the case of the headlamp unit of the movable unit type) in such a way that the bubble in the leveling gauge is set at the prescribed position.

In addition, the installation of the leveling gauge on the headlamp unit can be carried out in a very simple manner since the leveling gauge can be assembled into the headlamp unit merely by arranging the cover with the bubble vial held securely in the clasping part in the opening located in the upper area of the casing, connecting one end part to the casing of the leveling gauge with a lance coupling, and tightening the other end of the leveling gauge with a vertical screw.

Furthermore, since the mounting of the leveling gauge on the headlamp unit can be accomplished simultaneously with the assembly of the leveling gauge, the headlamp according to the present invention promotes operating efficiency and also attains a lower cost in comparison with the case in which the leveling gauge is assembled separately.

As it is believed evident from the description above, the headlamp unit according to the present invention indicates the amount of movement of the reflector in the upward and downward directions by the movement of the bubble in the leveling gauge, and it permits the reading of the movement of the bubble in the leveling gauge by observation through the observation window provided in the lamp body. Thus, the inventive headlamp unit makes it easy to read the amount of inclination of the irradiating angle of the headlamp beam in the upward and downward directions.

Moreover, the headlamp according to the present invention provides a high degree of freedom in the selection of the position where the leveling gauge and the cap with an observation window set therein can be installed. That is, although the positions for installing the leveling gauge and the cap with the observation window therein are necessarily limited to the area of the reflector in the proximity of the front lens in the case where the graduated scale is to be read through the transparent front lens, the headlamps of the above preferred embodiments of the present invention are free from such restrictions, so that the leveling gauge and the observation window can be arranged at positions selected with a greater degree of freedom, such as the wall in the upper area of the reflector and the wall in the upper area of the lamp body.

Moreover, as it is evident from the above description, the motor vehicle headlamp unit according to the present invention indicates on the leveling gauge the inclination of the reflector in the case of a movable reflector type or the lamp body and the reflector unit in the case of the movable reflector type in the upward and downward directions in relation to the datum component part, making it possible to read the amount of inclination of the inclinable component part in the upward and downward directions, namely, the amount of inclination of the irradiating angle of the headlamp beam in the upward and downward directions, from this leveling gauge.

In order to adjust the irradiating angle of the headlamp beam in the upward and downward directions, it is sufficient to make such an adjustment by moving the tilting component part in the upward an d downward directions in such a manner that the bubble in the leveling gauge is set at the prescribed position. Thus, the headlamp unit according to the invention enables anyone to perform easily the adjustment of the irradiating angle of the headlamp beam in the upward and downward directions.

Furthermore, the temperature around the leveling gauge changes in accordance with such factors as whether the bulb is turned on or off, and the amount of heat conducted to the casing of the leveling gauge varies depending on the length of the conduction path from the heat source. However, as the casing of the leveling gauge has good thermal conductivity, approximately the same amount of amount of heat is conducted to those areas with a longer conduction path as to those with a shorter heat conduction path, so that the amount of thermal conduction in the various areas of the casing is smoothed out. Therefore, the amount of heat conducted to the bubble vial by way of the casing presents practically no difference among the individual areas in the bubble vial, with the result that the entire liquid filled in the inside area of the bubble vial experiences substantially the same changes in temperature. Thus, unlike the conventional apparatus, the bubble vial according to the invention is free from such problems as bubble movement in consequence of differences in the temperature of the filled liquid at various points in the bubble vial. Therefore, the invention provides a headlamp unit incorporating a leveling gauge with a significantly reduced measuring error due to changes in ambient temperature, making it possible to make highly accurate adjustments of the irradiating angle of the headlamp beam in the upward and downward directions.

What is claimed is:

1. A motor vehicle headlamp comprising:
   a lamp body;
   a transparent lens closing said lamp body;
   a movable reflector disposed within said body;
   means for mounting said movable reflector within said lamp body so as to be tiltable in upward and downward and leftward and rightward directions;
   a leveling gauge for measuring an amount of inclination of said movable reflector, said leveling gauge being disposed on an outer surface of an upper wall of said reflector; and
   a cap having an observation window therein, said cap being fitted in an aperture in said lamp body at a position to permit observation of said leveling gauge through said observation window, said cap and said lamp body being provided separately from one another, said cap comprising means for fixing said cap to said lamp body after assembling said cap to said lamp body, and whereby said means for fixing said cap provides for quick release of said cap from said lamp body so that said leveling gauge may be accessed through said lamp body.

2. The motor vehicle headlamp of claim 1, wherein said observation window comprises magnifying lens means.

3. The motor vehicle headlamp of claim 1, further comprising an O-ring for sealing said cap to said lamp body.

4. The motor vehicle headlamp of claim 1, wherein said means for fixing said cap to said lamp body comprises a plurality of protrusions at a lower end of said cap, and a plurality of notches are formed along a peripheral portion of said aperture in said lamp body for allowing said protrusions to pass therethrough, said protrusions and notches forming a bayonet connection for securing said cap to said lamp body.

5. A motor vehicle headlamp comprising:
   a lamp body;
   a transparent lens closing said lamp body;
   a movable reflector disposed within said lamp body;
   means for mounting said movable reflector within said lamp body so as to be tiltable in upward and downward and leftward and rightward directions; and
   a leveling gauge for measuring the amount of inclination of said movable reflector in said upward and downward directions, said leveling gauge being disposed on an outer surface of an upper wall of said reflector at a position so as to be visible through a peripheral side portion of said lens, said leveling gauge comprising a casing formed integrally with said upper wall of said reflector and having an open upper end, a cover having a window therein mounted on said open upper end of said casing, a bubble vial having a graduated scale formed thereon, a bubble vial clasping portion formed on a lower side of said cover clasping said bubble vial with said graduated scale visible through said window, an indented lance coupling for securing one end part of said cover to said casing, and a screw and spring means connecting the other end part of said cover to said casing.

6. The motor vehicle headlamp of claim 5, wherein said indented lance coupling comprises: a hook protruding downward from said one end portion of said cover, said hook being received in a concave portion formed in an end wall of said casing, and a pair of suspending parts extending from said cover on opposite sides of said hook, said suspending parts contacting an upper edge of said end wall of said casing.

7. The motor vehicle headlamp of claim 6, wherein said screw passes through a screw inserting hole formed in a rear end part of said cover, and said spring means comprises a spring washer disposed between said rear end part of said cover and an upper end of a side wall portion of said casing.

8. The motor vehicle headlamp of claim 6, wherein said screw passes through a screw inserting hole formed in a rear end part of said cover, and said spring means comprises a pair of bent extensions formed on opposite sides of said screw inserting hole.

9. The motor vehicle headlamp of claim 5, wherein said bubble vial clasping portion comprises a plurality of arc-shaped clasping pieces formed integrally with said cover.

10. A motor vehicle headlamp comprising:
a lamp body;
a reflector disposed within said lamp body;
a leveling gauge for measuring the amount of inclination of said reflector in upward and downward directions, said leveling gauge being disposed on an outer surface of an upper wall of said reflector, said leveling gauge comprising a bubble vial having a graduated scale formed thereon, an aperture being provided in a wall of said reflector for allowing light to pass therethrough and illuminate said bubble vial.

11. The motor vehicle headlamp of claim 10, further comprising a half-silvered mirror disposed in said aperture.

12. A motor vehicle headlamp comprising:
a lamp body comprising a reflector portion;
a transparent lens closing said lamp body;
means for mounting said lamp body so as to be tiltable in upward and downward and leftward and rightward directions; and
a leveling gauge for measuring the amount of inclination of said lamp body in said upward and downward directions, said leveling gauge being disposed on an outer surface of an upper wall of said lamp body, said leveling gauge comprising a casing formed integrally with said upper wall of said lamp body and having an open upper end, a cover having a window therein mounted on said open upper end of said casing, a bubble vial having a graduated scale formed thereon, a bubble vial clasping portion formed on a lower side of said cover clasping said bubble vial with said graduated scale visible through said window, an indented lance coupling for securing one end part of said cover to said casing, and a screw and spring means connecting the other end part of said cover to said casing.

13. A motor vehicle headlamp comprising:
a lamp body;
a transparent lens closing said lamp body;
a movable reflector disposed within said lamp body;
means for mounting said movable reflector within said lamp body so as to be tiltable in upward and downward and leftward and rightward directions; and
an inclination measuring instrument for measuring an amount of inclination of said movable direction, said inclination measuring instrument being disposed between said lamp body and said movable reflector; and
a cap having an observation window therein, said cap being fitted in an aperture in said lamp body at a position to permit observation of said inclination measuring instrument through said observation window, said cap and said lamp body being provided separately from one another, said cap comprising mean s for fixing said cap to said lamp body after assembling said cap to said lamp body, and whereby said means for fixing said cap provides for quick release of said cap from said lamp body so that said inclination measuring instrument may be accessed through said lamp body.

14. The motor vehicle headlamp of claim 13, wherein said inclination measuring instrument is disposed between an upper portion of said lamp body and an upper portion of said movable reflector, and said aperture is formed in an upper wall of said lamp body.

15. The motor vehicle headlamp of claim 13, wherein said inclination measuring instrument comprises a cylindrically shaped protruding part formed integrally with said lamp body and protruding toward said reflector, a cylindrically shaped transparent supporting member, a calibrated rod member slidably received in said supporting member, and a compression spring positioned inside said supporting member and applying a spring force against said rod member to urge an end of said rod member against said reflector.

16. The motor vehicle headlamp of claim 15, wherein said supporting member is threadedly engaged with said protruding part to allow adjustment of said inclination measuring instrument.

* * * * *